(12) United States Patent
Ishinoda et al.

(10) Patent No.: US 11,491,973 B2
(45) Date of Patent: Nov. 8, 2022

(54) PARKING ASSIST APPARATUS AND A METHOD OF CONTROLLING THE PARKING ASSIST APPARATUS

(71) Applicant: Faurecia Clarion Electronics Co., Ltd., Saitama (JP)

(72) Inventors: Makoto Ishinoda, Saitama (JP); Shinya Tagawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 17/329,283

(22) Filed: May 25, 2021

(65) Prior Publication Data

US 2021/0370917 A1    Dec. 2, 2021

(30) Foreign Application Priority Data

May 27, 2020  (JP) .............................. JP2020-091913
May 27, 2020  (JP) .............................. JP2020-092497

(51) Int. Cl.
  *B60W 30/06*   (2006.01)
  *G01S 15/931*  (2020.01)
  *G06V 20/58*   (2022.01)

(52) U.S. Cl.
  CPC ........... *B60W 30/06* (2013.01); *G01S 15/931* (2013.01); *G06V 20/58* (2022.01); *G06V 20/586* (2022.01); *G01S 2015/933* (2013.01)

(58) Field of Classification Search
  CPC ...... B60W 30/06; B60W 40/00; B60W 40/02; B60W 50/00; G01S 15/931; G01S 2015/933; G06V 20/58; G06V 20/586; G08G 1/168; B62D 15/0285
  See application file for complete search history.

(56) References Cited

U.S. PATENT DOCUMENTS

2017/0028914 A1    2/2017  Kiyokawa et al.
2020/0070814 A1    3/2020  Park et al.
2021/0213937 A1*   7/2021  Imai ...................... B60W 30/06

FOREIGN PATENT DOCUMENTS

EP         3124360 A1      2/2017
JP      2004-203315 A      7/2004
JP      2013-241088 A     12/2013
JP      2019-182154 A     10/2019
WO    WO-2018232889 A1  * 12/2018  ........... G08G 1/0968

OTHER PUBLICATIONS

Extended European Search Report mailed by European Patent Office dated Sep. 24, 2021 in corresponding European patent application No. 21175680.4-1009.

* cited by examiner

*Primary Examiner* — Daryl C Pope
(74) *Attorney, Agent, or Firm* — IP Business Solutions, LLC

(57) ABSTRACT

A parking assist apparatus comprises a position detection unit configured to detect a current position of a vehicle, a sensor provided to the vehicle to detect a periphery of the vehicle, a parking area detection unit configured to detect a parking area in which the vehicle can be parked based on information of the sensor, a parking path computing unit configured to calculate a path along which the vehicle is to be moved from a current position to the parking area based on a parking area detected by the parking area detection unit and a current position of the vehicle.

8 Claims, 16 Drawing Sheets

PARKING ASSIST APPARATUS AND A METHOD OF CONTROLLING THE PARKING ASSIST APPARATUS

INCORPORATION BY REFERENCE

The present application claims priority under 35 U.S.C. § 119 to Japanese Patent Application No. 2020-091913 filed on May 27, 2020 and Japanese Patent Application No. 2020-092497 filed on May 27, 2020. The content of the applications is incorporated herein by reference in its entirety.

BACK GROUND OF THE INVENTION

Field of the Invention

The present invention is related to a parking assist apparatus and a method of controlling the parking assist apparatus.

Description of the Related Art

Japanese Patent Laid-Open No. 2013-241088 discloses a technique related to parking assistance.

The section of the abstract in Japanese Patent Laid-Open No. 2013-241088 describes a problem of being "capable of performing parking assistance safely without affecting paths of other vehicles."

The abstract in Japanese Patent Laid-Open No. 2013-241088 describes a means for solving the problem as follows: "The parking assist apparatus in the present application comprises an external detection sensor input processing unit that generates peripheral information based on a sensor input from an external detection sensor that detects the outside of a vehicle, a parking position setting unit that sets the parking position, a virtual obstacle generation unit that generates virtual obstacle information based on parking position set by the parking position setting unit, and a parking path computing unit that generates parking paths from the current position of a vehicle to the parking position based on the peripheral information and the virtual obstacle information."

In order to obtain more appropriate parking paths in Japanese Patent Laid-Open No. 2013-241088, there has been a room for improvement in settings of virtual obstacles.

The present invention is directed to providing a parking assist apparatus that can obtain more appropriate parking paths and a method of controlling the parking assist apparatus.

SUMMARY OF THE INVENTION

One aspect of the present invention is a parking assist apparatus comprising: a position detection unit configured to detect a current position of a vehicle; a sensor provided on the vehicle, the sensor being configured to detect a periphery of the vehicle; a parking area detection unit configured to detect a parking area in which the vehicle can be parked based on information of the sensor; and a parking path computing unit configured to calculate a path along which the vehicle is to be moved from the current position to the parking area based on the parking area detected by the parking area detection unit and a current position of the vehicle.

According to the aspect of the present invention, more appropriate parking paths can be obtained.

DETAILED DESCRIPTION OF THE PREFERRED EMBODIMENT

Hereinafter, the embodiment of the present invention is described with reference to the drawings.

First Embodiment

Figure 1:
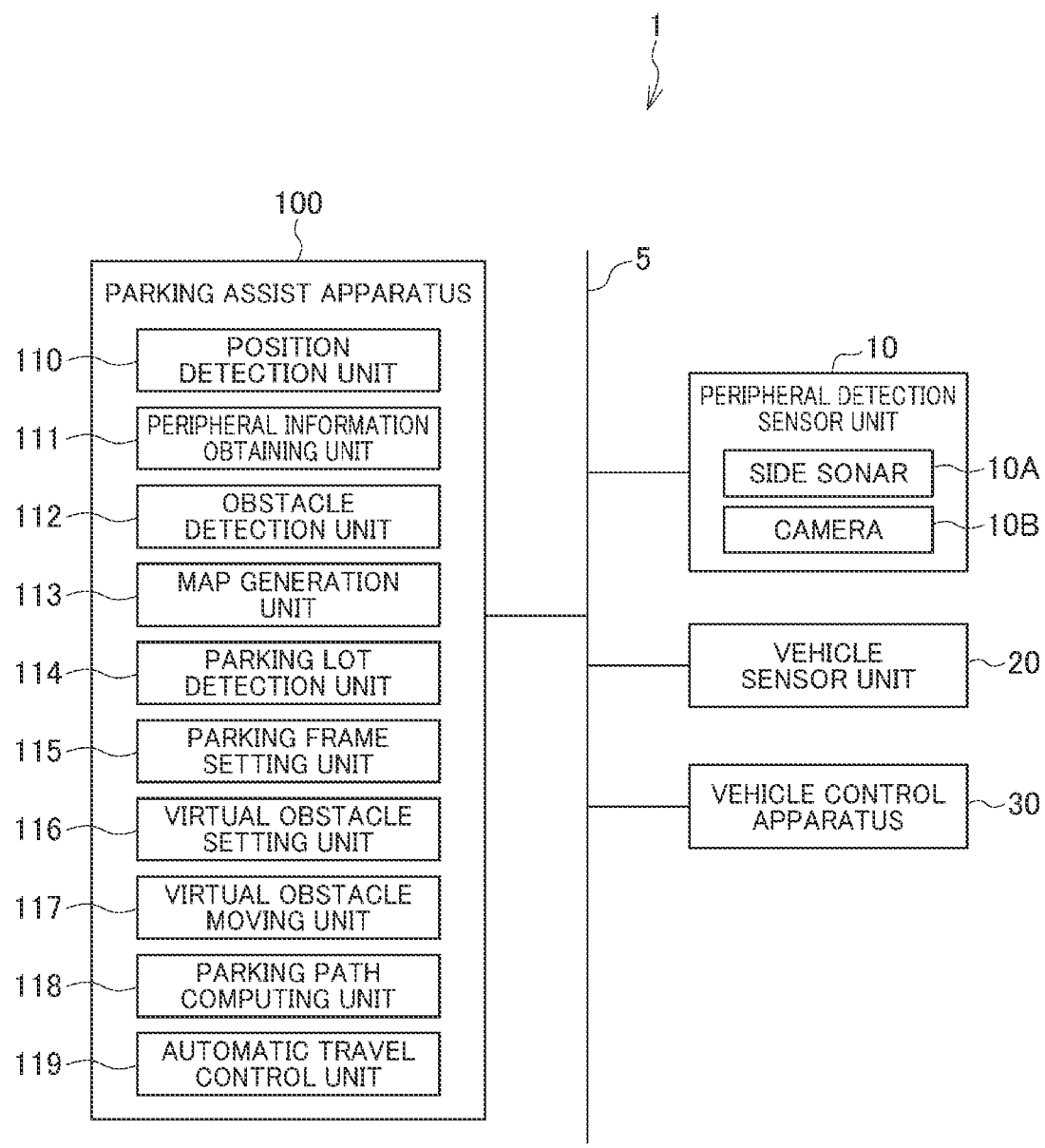
FIG. 1 is a diagram showing the structure of a vehicle mounted with the parking assist apparatus according to the first embodiment of the present invention.

FIG. 1 is a diagram showing the structure of a vehicle 1 mounted with a parking assist apparatus 100 according to the present embodiment.

The vehicle 1 comprises a peripheral detection sensor unit 10, a vehicle sensor unit 20, a vehicle control apparatus 30, and a parking assist apparatus 100, and these are connected through a vehicle-mounted network 5 such as a CAN (Controller Area Network) bus so as to communicate data.

The peripheral detection sensor unit 10 comprises various kinds of sensors for detecting information on a periphery of the vehicle 1, and outputs detection results (output) to a parking assist apparatus 100. Hereinafter, the information on the periphery is referred to as the "peripheral information."

The peripheral information includes information on objects existing in a periphery of the vehicle 1. The objects are obstacles, and division lines dividing a parking lot for the vehicle 1, for example. The obstacles are various objects that can be obstruction to the travel of the vehicle 1. Typical examples of the obstacles are building structures such as pillars, walls and fire hydrants, other vehicles while parking and traveling, and passersby.

The peripheral detection sensor unit 10 of the present embodiment comprises a side sonar 10A and a camera 10B.

The side sonar 10A is a distance measuring sensor of detecting a peripheral obstacle with sound waves to measure the distance between the obstacle and the vehicle 1.

Figure 2:
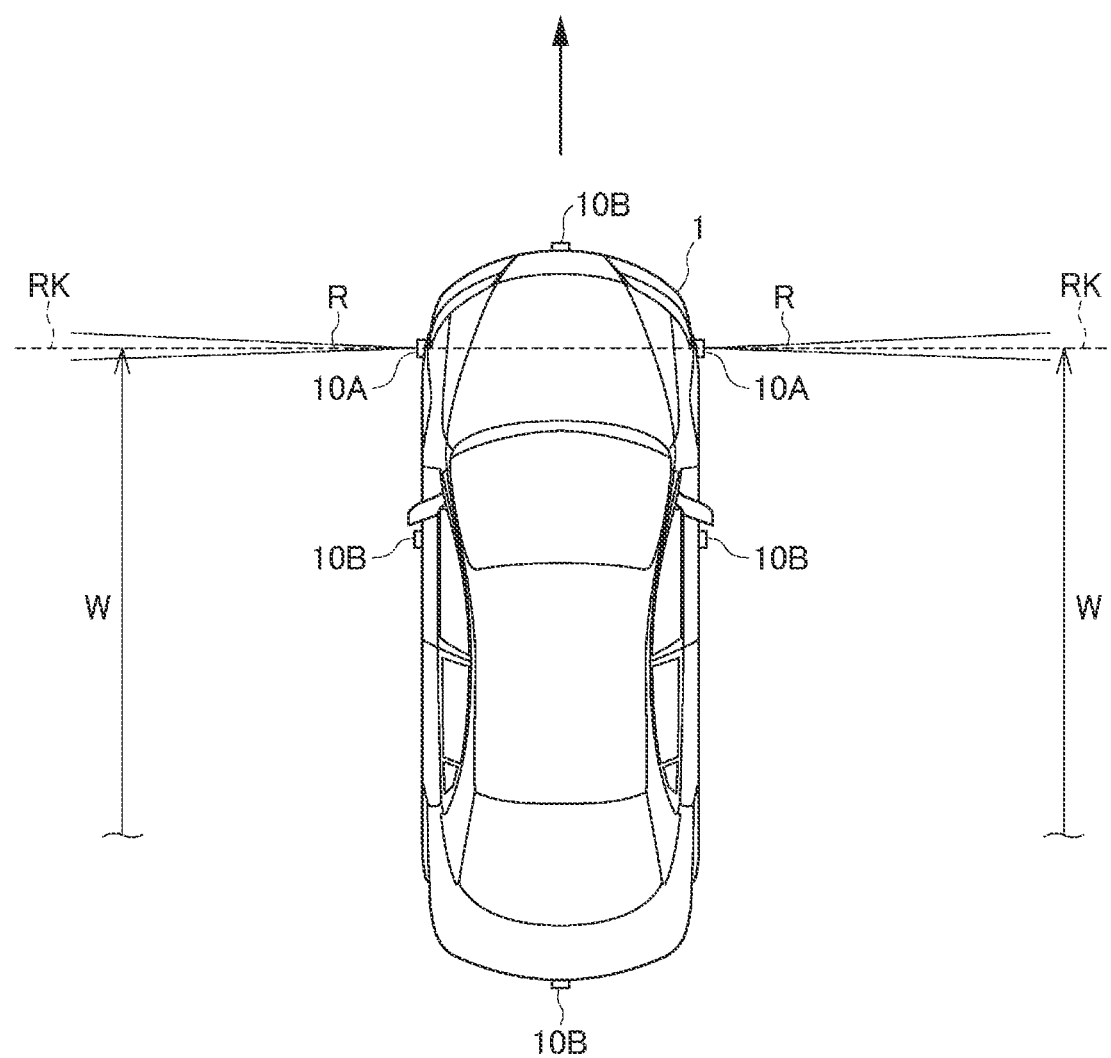
FIG. 2 is a diagram showing one example of installation mode of a side sonar and a camera.

The side sonar 10A is, as shown in FIG. 2, disposed in each of the left and right sides of the vehicle 1. In the side sonar 10A, the central angle of a detection range R formed in a fan-shape is narrower than that of an ordinal sonar such that the detection range R is substantially beam shaped. As a result, the side sonar 10A has a high directivity to a side of the vehicle 1, and precisely detects obstacles in a position relatively far (e.g., 5 m) from the vehicle 1. As the vehicle 1 travels (forward traveling in the example of FIG. 2), obstacles are precisely detected in an area W, through which the detection range R of the side sonar 10A of the vehicle 1 has passed.

Figure 3:
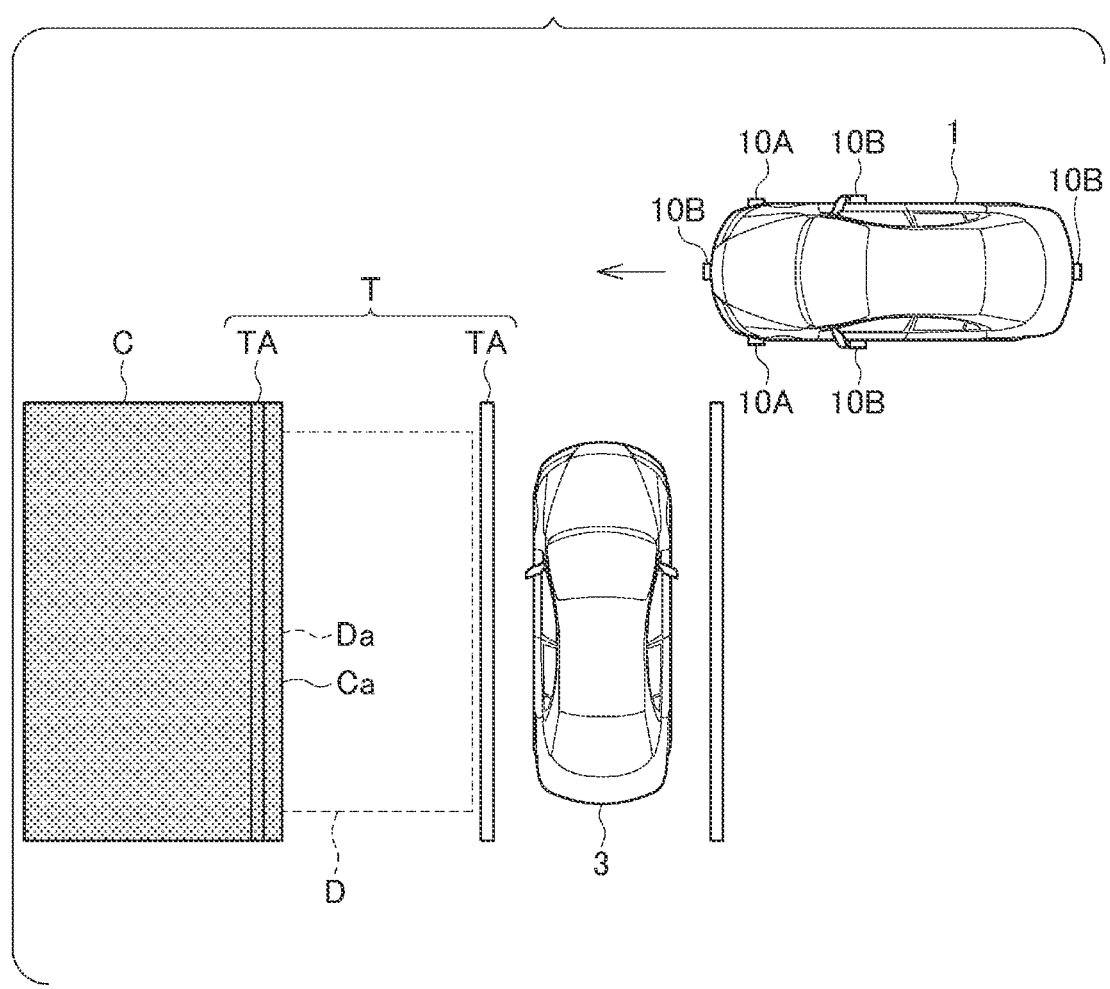
FIG. 3 is a diagram showing a parking lot.

The camera 10B is an image capturing means configured to capture images of a parking lot T (FIG. 3).

The vehicle 1 in the present embodiment is, as shown in FIG. 2, provided with the cameras 10B in the front and rear positions and the left and right positions, respectively. Images of all directions about the vehicle 1 are captured by these cameras 10B.

Note that the images of all the directions may be captured by one camera 10B. In addition, the capturing range by the camera 10B and the number of the camera 10B may be appropriately changed.

The vehicle sensor unit 20 comprises various kinds of sensors for detecting a traveling state of the vehicle 1 and various information required for an autonomous navigation (dead reckoning). Such a sensor is a sensor mounted on the vehicle 1, such as a gyro sensor, an acceleration sensor, a vehicle speed sensor, and a steering angle sensor of detecting a steering angle of the vehicle 1 and the like.

The vehicle control apparatus 30 controls a steering apparatus, a driving apparatus and a brake control apparatus which are provided in the vehicle 1 so as to make the vehicle 1 autonomously move (automatic travel) based on parking paths described later, which are calculated by the parking assist apparatus 100. The vehicle control apparatus 30 comprises a computer executing such a control (e.g., an ECU (Electronic Control Unit)).

Note that the steering apparatus is an apparatus configured to include an actuator for steering a steering wheel of the vehicle 1.

In addition, the driving apparatus is an apparatus configured to include an actuator of adjusting driving force on the steering wheel of the vehicle 1. If a power source of the vehicle 1 is an engine, the actuator of the driving apparatus is a throttle actuator. If the power source is a motor, the actuator of the driving apparatus is a power source motor.

The brake control apparatus comprises an actuator that controls a brake system provided in the vehicle 1 so as to control braking force applied to wheels of the vehicle 1.

The parking assist apparatus 100 is an apparatus configured to make the vehicle 1 automatically travel to the parking lot T so as to assist parking of the vehicle 1.

The parking assist apparatus 100 comprises a computer comprising processors such as a CPU (Central Processing Unit) and an MPU (Microprocessor Unit), memory devices (memory) (also referred to as main storage apparatuses) such as a ROM (Read Only Memory) and a RAM (Random Access Memory), storage apparatuses (memory) (also referred to as auxiliary storage apparatuses) such as an HDD (Hard Disk Drive) and an SSD (Solid State Drive), an interface circuit for connecting sensors, peripheral devices and the like, and a vehicle-mounted network communication circuit of communicating with other vehicle mounted devices via the vehicle-mounted network 5. As such a computer, an ECU (Electronic Control Unit) is used.

In the parking assist apparatus 100, the processors execute computer programs stored in the memory devices or storage apparatuses, and thereby various functional configurations shown in FIG. 1 are realized.

Namely, the parking assist apparatus 100 comprises, as the functional configurations, a position detection unit 110, a peripheral information obtaining unit 111, an obstacle detection unit 112, a map generation unit 113, a parking lot detection unit 114, a parking frame setting unit 115, a virtual obstacle setting unit 116, a virtual obstacle moving unit 117, a parking path computing unit 118, and an automatic travel control unit 119.

The position detection unit 110 detects the current position (self position) of the vehicle 1 based on detection result (output) by the vehicle sensor unit 20, using a publicly known or well-known dead reckoning method.

The peripheral information obtaining unit 111 obtains peripheral information based on detection result (output) by the peripheral detection sensor unit 10. As described above, the detection range R of the side sonar 10A is in a fan-shape as shown in FIG. 2. Additionally, this side sonar 10A has a configuration that the most reliable detection result can be obtained in the range of a predetermined angle (where 0<the predetermined angle<the central angle of the fan-shape) about a main axis RK as the center of the fan-shape (coinciding with the orientation direction of detection) among the detection range R.

The obstacle detection unit 112 detects an obstacle in a periphery of the vehicle 1 based on the peripheral information.

More specifically, the obstacle detection unit 112 detects a peripheral obstacle based on the detection result of the side sonar 10A and detects the position of the obstacle relative to the vehicle 1.

The obstacle detection unit 112 also detects an obstacle in a periphery of the vehicle 1 using information based on detection result in the range of the predetermined angle having the highest reliability in the detection range R of the side sonar 10A among the peripheral information.

The map generation unit 113 generates map data based on detection result of the obstacle detection unit 112. The map data is data in which positions of obstacles are recorded to a local spatial coordinate system having the current position of the vehicle 1 at an arbitral timing being set as the origin. Such map data enables to specify the distribution of obstacles in the periphery of the vehicle 1.

The parking lot detection unit 114 functions as a parking area detection unit that detects a parking area in which the vehicle 1 is to be parked, and the parking lot detection unit 114 in the present embodiment detects a parking lot T as a lot of this parking area based on captured images as one of the peripheral information.

FIG. 3 is a diagram showing a parking lot T to be detected.

As shown in FIG. 3, the parking lot T is an area for parking divided by division lines TA drawn on the ground, and the division lines TA are also referred to as parking frame lines or white lines.

The parking lot detection unit 114 detects a parking lot T by recognizing the division lines TA via image recognition of images captured by the camera 10B. The parking lot detection unit 114 also converts, by a projection conversion from a two-dimensional coordinate system of a captured image to a local spatial coordinate system of map data, the position of the parking lot T in the captured images to a position of the local spatial coordinate system of the map data. This projection conversion can be performed by a publicly known or well-known arbitral technique.

The parking frame setting unit 115 sets, based on the parking lot T detected by the parking lot detection unit 114, a rectangular parking frame D in the parking lot T as shown in FIG. 3. The parking frame D is a frame defining a range in which the vehicle 1 is accommodated while parking in the parking lot T.

In the present embodiment, with regard to the division lines TA of the parking lot T, the parking frame setting unit 115 sets the parking frame D such that the side opposite to a target division line TA is substantially parallel thereto as shown in FIG. 3.

The virtual obstacle setting unit 116 sets a virtual obstacle C farther when viewed from a position frontward beyond the parking frame D. The position frontward beyond the parking frame D is typically a position of the vehicle 1 advancing forward to the front parking frame D as shown in FIG. 3.

The virtual obstacle C is an obstacle that is virtually set, separately from obstacles detected based on detection result of the peripheral detection sensor unit 10.

In the present embodiment, the virtual obstacle setting unit 116 sets the virtual obstacle C in a position (initial position) in contact with the farthest side of the parking frame D when viewed from a position frontward beyond the parking frame D. The side at the farther side in the present embodiment is a side at the farther side of longitudinal sides that extend in the forward and reverse directions of the vehicle 1 in a parked state, and hereinafter, referred to as the farthest side Da.

Note that the size and shape of the virtual obstacle C may be set based on the size of the parking frame D or the sizes and the like of obstacles (a wall and another vehicle 3 (FIG. 3), etc.) contemplated to exist next to the parking frame D. In such a case, the virtual obstacle C is set in a shape at least including a straight-line portion Ca extending along the farthest side Da of the parking frame D.

In the present embodiment, the virtual obstacle C has a rectangular shape showing the another vehicle 3 which can be parked next to the parking lot T, the size of this virtual obstacle C is set based on the size of the another vehicle 3, and the straight-line portion Ca is arranged side-by-side with the parking frame D so as to be in parallel with the farthest side Da of the parking frame D.

The virtual obstacle moving unit 117 moves the position of the virtual obstacle C set by the virtual obstacle setting unit 116 based on the position of the detection range R in the side sonar 10A at the time of the start of automatic parking.

Figure 4:
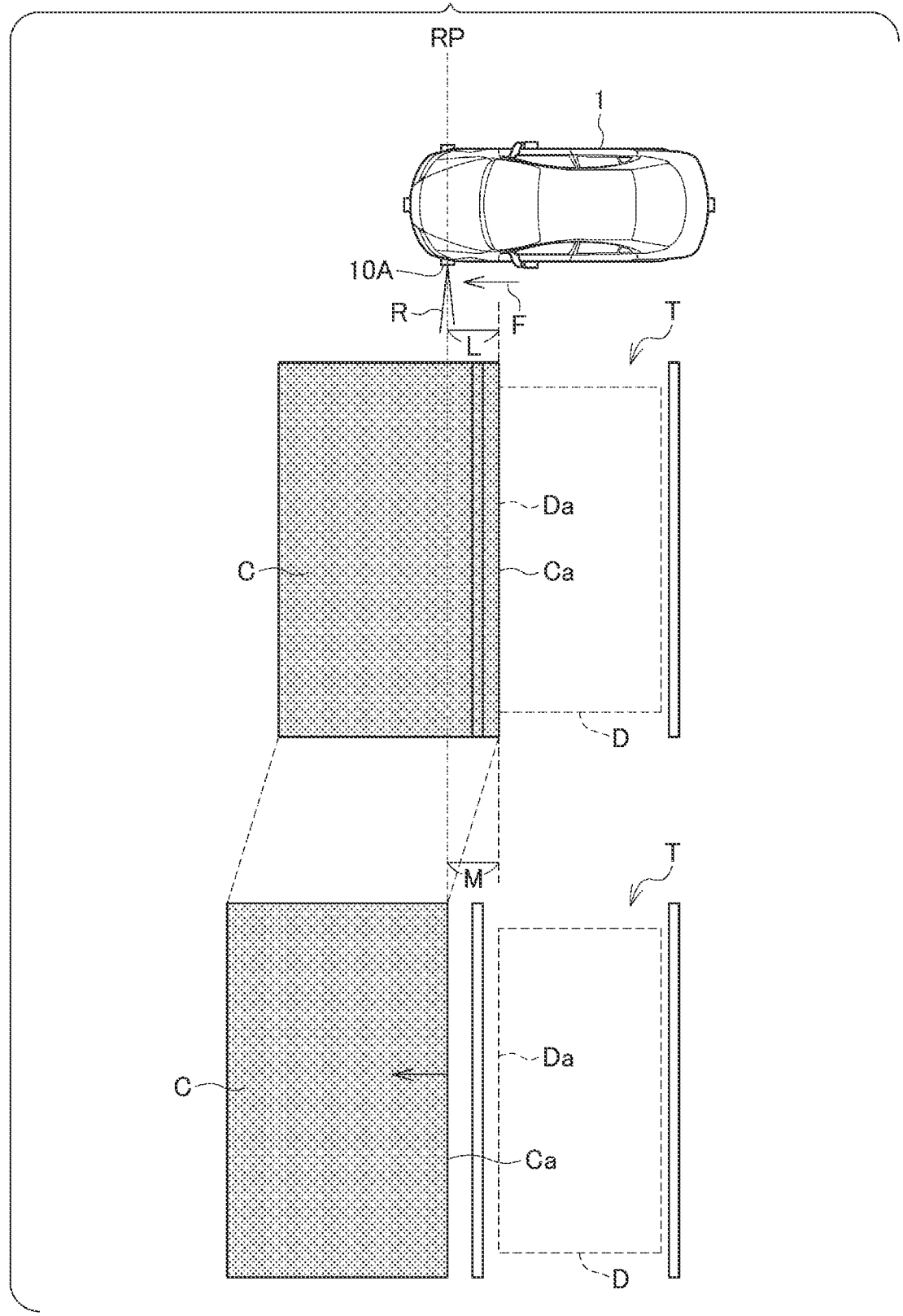
FIG. 4 is a diagram showing a movement of position of a virtual obstacle based on a position of detection range of a side sonar.

FIG. 4 is a diagram showing the movement of the position of the virtual obstacle C based on the position of the detection range R in the side sonar 10A.

The vehicle 1 passes through the parking frame D as shown in FIG. 4, and thereby the virtual obstacle moving unit 117 moves the virtual obstacle C in a passing direction F of the vehicle 1 by a moving amount M corresponding to a separation distance L between the position of the detection range R in the side sonar 10A and the farthest side Da, in a case where the detection range R in the side sonar 10A is positioned farther than the farthest side Da when viewed from a position frontward beyond the parking frame D. The passing direction F is a forward advance direction when the vehicle 1 passes through the parking frame D.

Hereinafter, the position of the detection range R in the side sonar 10A is referred to as "the sonar detection position RP." As the sonar detection position RP, the position (generally being the same as the arrangement position of the side sonar 10A in the vehicle 1) of a main axis RK (FIG. 2) of a search wave in a beam form of the side sonar 10A is used.

In addition, in the present embodiment, the virtual obstacle moving unit 117 moves the virtual obstacle C in the passing direction F such that parallelism between the straight-line portion Ca of the virtual obstacle C and the farthest side Da of the parking frame D is maintained (i.e., parallel movement).

Figure 5:
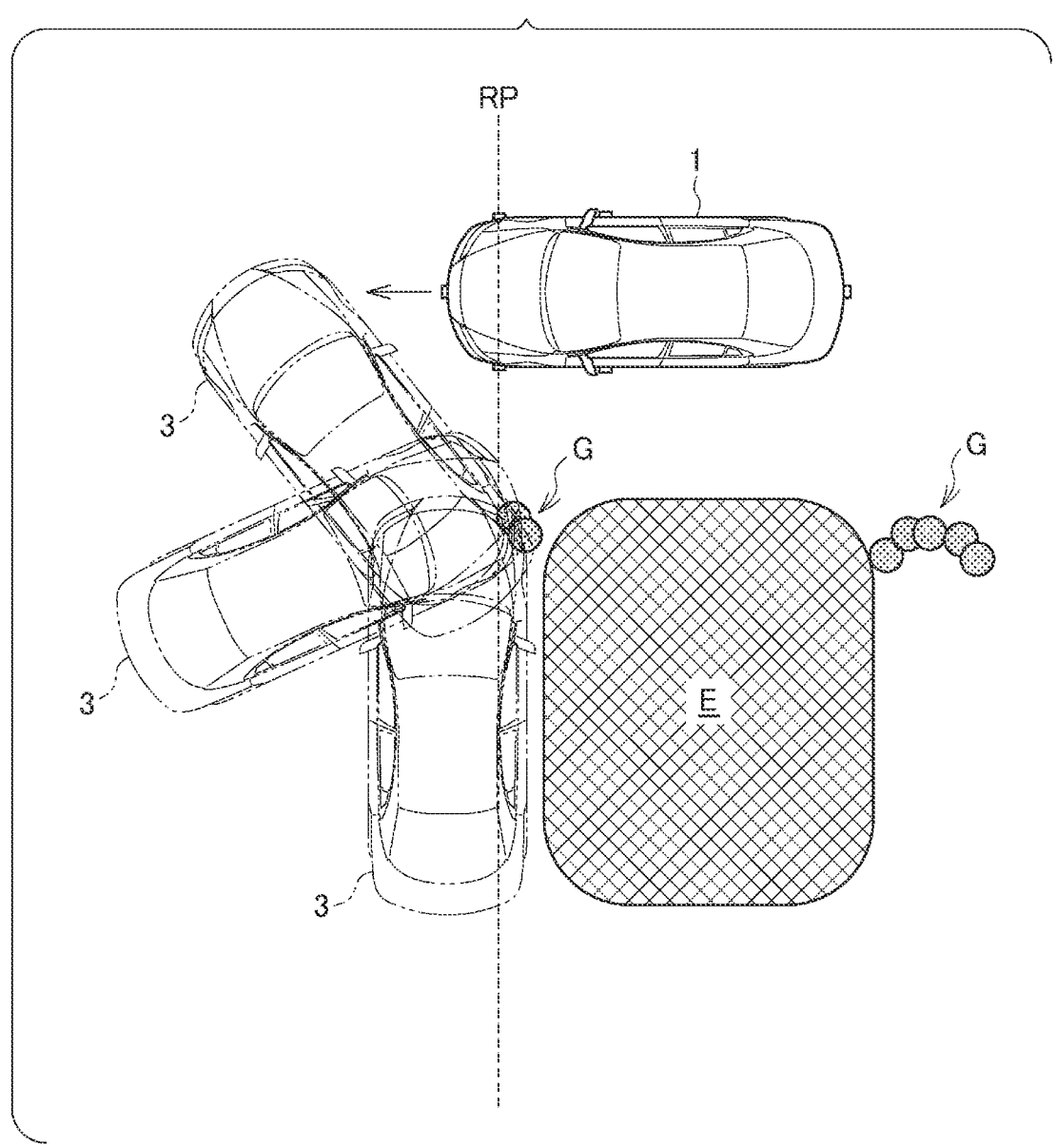
FIG. 5 is a diagram showing a detection example of an available parking space based on detection result of an obstacle by a side sonar.

More specifically, in a configuration of detecting an available parking space E in which the vehicle 1 can be parked based on detection result of obstacles by the side sonar 10A, the posture (front and rear direction) of the vehicle 1 at the time of parking in the available parking space E is not determined even if the available parking space E is detected between two point clouds G showing obstacles as shown in FIG. 5, for example. Further, when an obstacle at the farther side in the available parking space E is another vehicle 3, the posture of this another vehicle 3 is not uniquely determined as also shown in FIG. 5.

On the other hand, in the present embodiment, a parking lot T is detected as the available parking space E based on captured images; therefore, the posture of the vehicle 1 in the parking lot T at the time of parking can be specified by the extension direction of division lines TA. In addition, when another vehicle 3 exists as an obstacle next to the parking lot T, the posture of this another vehicle 3 is in a direction corresponding to the extension direction of the division lines TA as well. That is, the detection of a parking lot T enables to specify the posture of the another vehicle 3 which can exist next to the parking lot T, and the parallel movement of the virtual obstacle C enables to move the virtual obstacle C with respect to the parking lot T so as to match the posture of the another vehicle 3.

Further, the moving amount M of the virtual obstacle C in the present embodiment is set to be equal to or less than the separation distance L.

Figure 6:
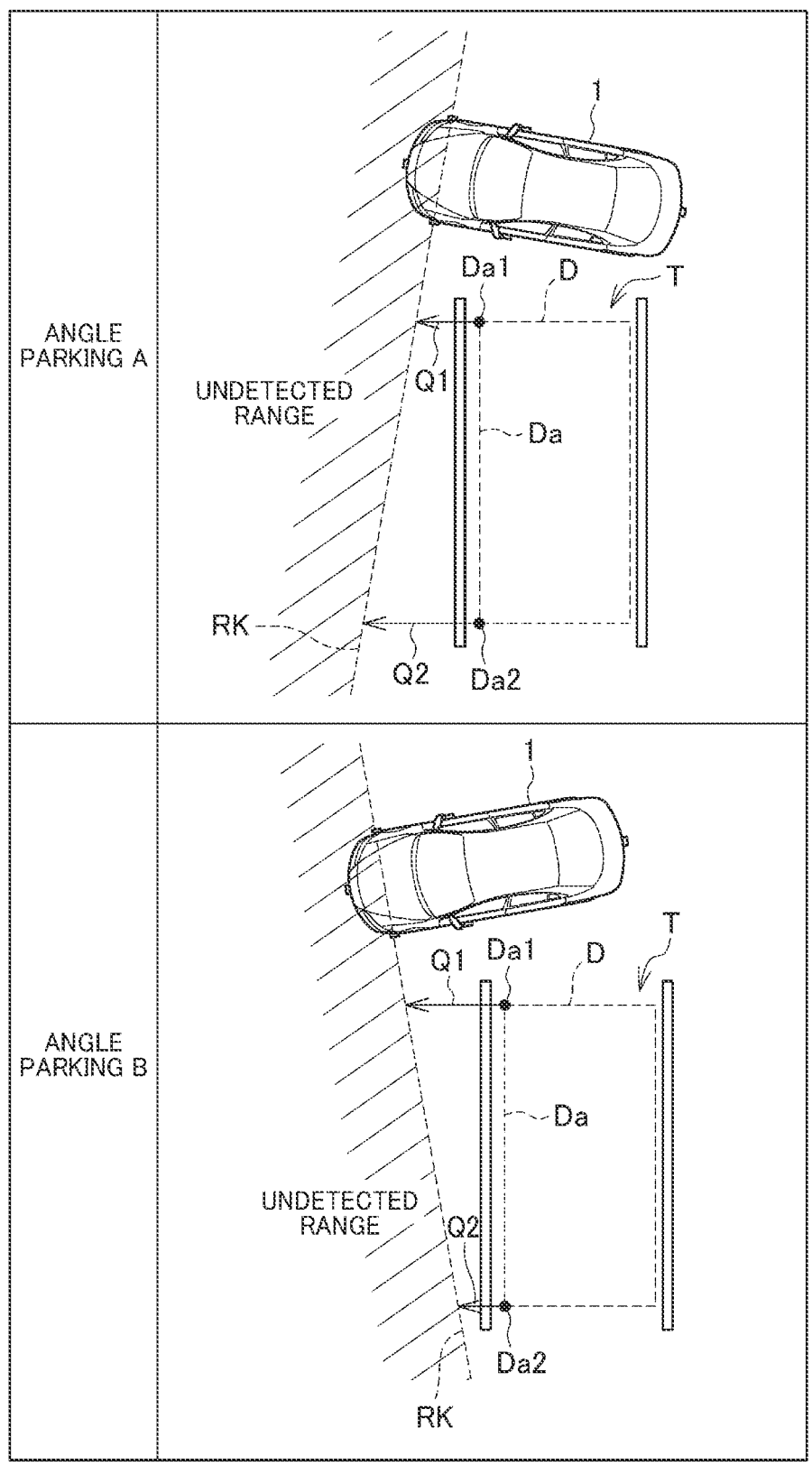
FIG. 6 is a diagram for explaining separation distances.

The distance as follows is used as this separation distance L as shown in FIG. 6, in consideration of the case where the vehicle 1 has a posture oblique to the parking frame D of the vehicle 1.

Specifically, as shown in FIG. 6, assuming a front end Da1 and a rear end Da2 of the farthest side Da of the parking frame D as origins, perpendicular lines Q1 and Q2 drawn perpendicularly to the farthest side Da toward the main axis RK of the sonar detection position RP are obtained, the lengths of whichever shorter is used as the separation distance L.

The front end Da1 of the farthest side Da is an end point at a side closer to the vehicle 1, and the rear end Da2 is an end point at a side farther from the vehicle 1.

When the vehicle 1 is stopped in a posture that a tip side is moved away from the parking frame D compared to a rear end side as shown by an oblique parking A in FIG. 6, the length of the perpendicular line Q1 extending from a front end Da1 of the farthest side Da is used as the separation distance L.

In addition, when the vehicle 1 is stopped in a posture that the tip side is moved closer to the parking frame D compared to the rear end side as shown by an oblique parking B in FIG. 6, the length of the perpendicular line Q2 extending from a rear end Da2 of the farthest side Da is used as the separation distance L.

As a result, the moving amount M of the virtual obstacle C is maintained to an amount that the straight-line portion Ca of this virtual obstacle C does not enter a range not detected by the side sonar 10A.

Note that, as shown in FIG. 4 above, since the lengths of the perpendicular lines Q1 and Q2 are equal when the posture of the vehicle 1 is perpendicular to the parking frame D, either length may be used as the separation distance L.

The parking path computing unit 118 computes and calculates parking paths based on map data (i.e., distribution of obstacles detected based on the peripheral information), the virtual obstacle C, and the parking frame D set by the parking frame setting unit 115.

The parking paths in the present embodiment are paths of moving the vehicle 1 from the current position of the vehicle 1 to the parking lot T such that the vehicle 1 is parked in the parking frame D of the parking lot T by reverse parking without colliding with the peripheral obstacles and the virtual obstacles C.

The reverse parking refers to entering the vehicle 1 to the parking lot T by moving it backward.

The automatic travel control unit 119 generates control information for advancing the vehicle 1 by automatic travel, and outputs the control information to the vehicle control apparatus 30.

The vehicle control apparatus 30 executes control based on the control information, and thereby the vehicle 1 automatically travels to the parking lot T so as to automatically enter therein.

Next, an operation of the present embodiment will be explained.

While a passenger drives the vehicle 1 to move in a parking, in the parking assist apparatus 100, the obstacle detection unit 112 continuously detects obstacles in the periphery (e.g., another vehicle 3 (FIG. 3)) based on peripheral information, and the map generation unit 113 sequentially records positions of obstacles, which have been detected by the obstacle detection unit 112, in map data. Additionally, the parking lot detection unit 114 continuously detects the parking lot T existing in front of or at a side of the vehicle 1 based on the image recognition result of captured images.

Figure 7:
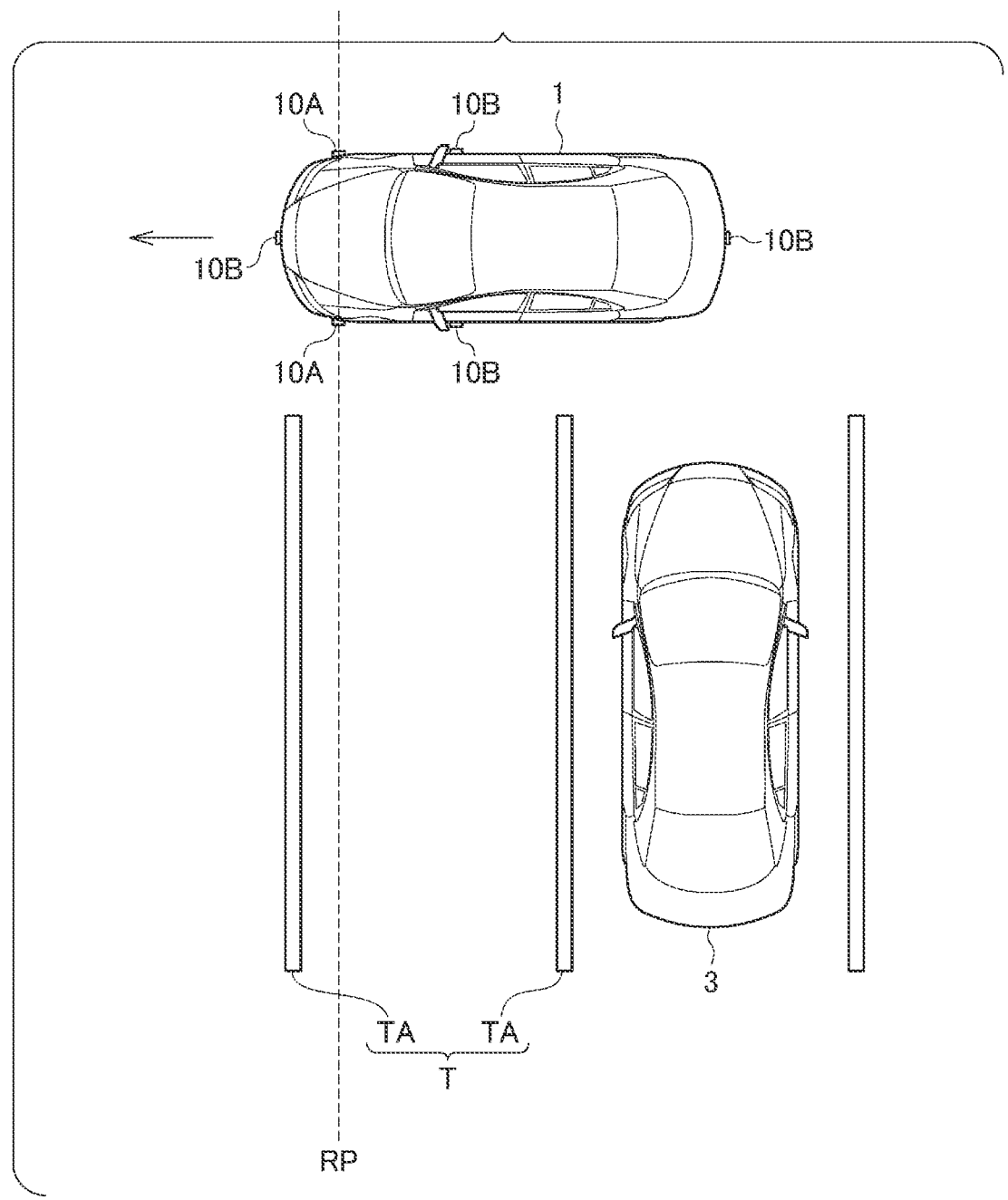
FIG. 7 is a diagram for explaining detection timing of a parking lot.

The parking lot detection unit 114 detects the parking lot T based on the captured images of the camera 10B, and thereby the parking lot T is immediately detected at a timing before the sonar detection position RP passes through the parking lot T as shown in FIG. 7, or, even after the sonar detection position RP has passed through the parking lot T, at a timing before a space with a size corresponding to the parking lot T is recorded in the map data based on the detection result of the side sonar 10A.

After that, the passenger stops the vehicle 1 and operates an HMI (Human Machine Interface) not being shown so as to instruct the parking assist apparatus 100 to perform automatic parking.

The parking assist apparatus 100 starts, when the instruction for automatic parking is input, automatic parking processing for making the vehicle 1 to enter the parking lot T by automatic travel.

Figure 8:
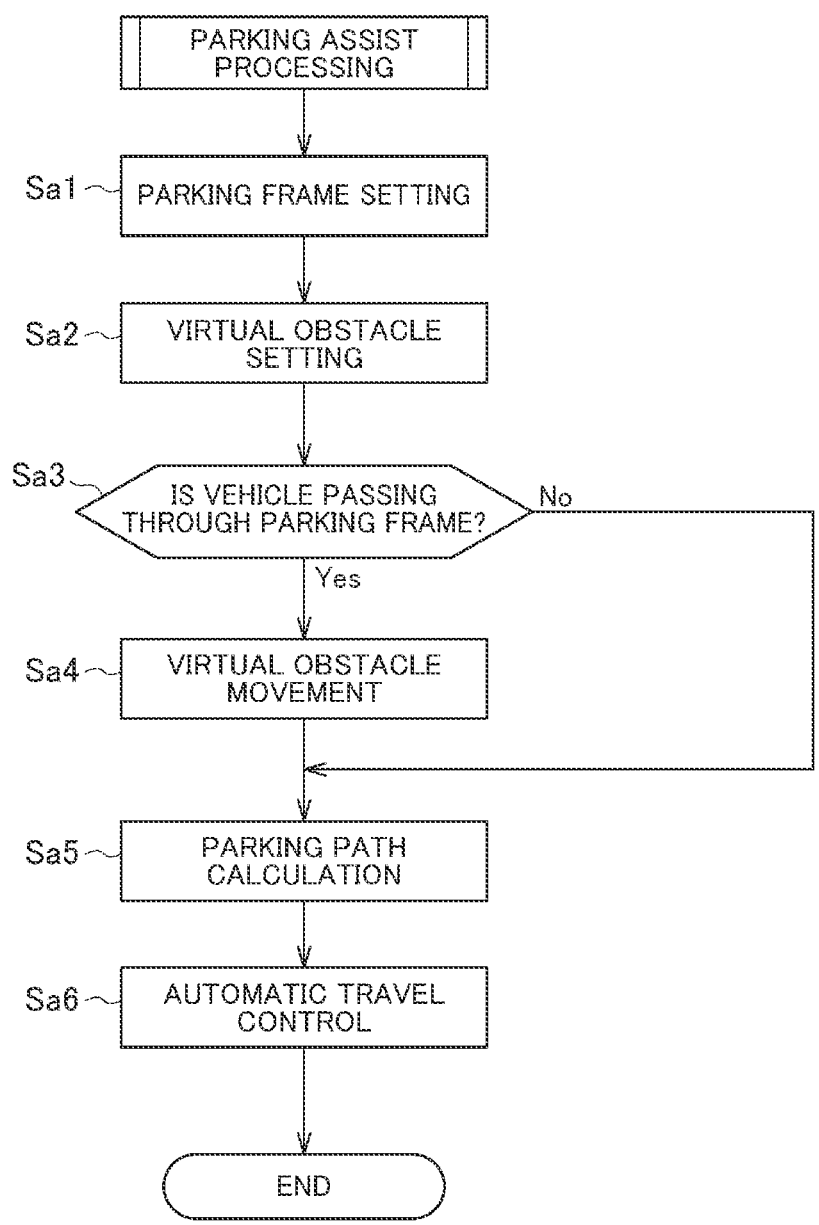
FIG. 8 is a flow chart of parking assist processing.

FIG. 8 is a flow chart of automatic parking processing.

First of all, the parking frame setting unit 115 sets the parking frame D with respect to the parking lot T (step Sa1).

Next, the virtual obstacle setting unit 116 sets a virtual obstacle C at an initial position where the straight-line portion Ca is in contact with the farthest side Da of the parking frame D (step Sa2).

Then, the virtual obstacle moving unit 117 determines, based on the current position of the vehicle 1 and the position of the parking frame D, whether the sonar detection position RP has passed through the parking frame D, in other words, whether the sonar detection position RP of the vehicle 1 is positioned farther than the farthest side Da of the parking frame D (step Sa3).

If the sonar detection position RP has not passed through the parking frame D (step Sa3: No), the sonar detection position RP is positioned in front of the farthest side Da, and a position farther than the parking frame D has not been detected by the side sonar 10A yet. In such a case, the position of the virtual obstacle C is fixed to an initial position.

On the other hand, if the sonar detection position RP has passed through the parking frame D (step Sa3: Yes), the virtual obstacle moving unit 117 calculates the aforementioned separation distance L based on the current position of the vehicle 1 and the position of the parking frame D so as to move the virtual obstacle C in parallel by a moving amount M corresponding to this separation distance L (step Sa4).

The parking path computing unit 118 then computes and calculates parking paths along which the vehicle 1 is to be moved from the current position to the parking lot T without colliding with obstacles or virtual obstacles, based on the current position of the vehicle 1, and the respective positions of the obstacles in the map data, the virtual obstacles and the parking lot T (parking frame D) (step Sa5).

Additionally, in order to make the vehicle 1 automatically travel along a parking path to the parking lot T, the automatic travel control unit 119 generates control information based on the parking path and outputs the control information to the vehicle control apparatus 30 (step Sa6). As a result, the vehicle 1 starts automatic travel by the control of the vehicle control apparatus 30 to perform parking in the parking lot T.

Figure 9:
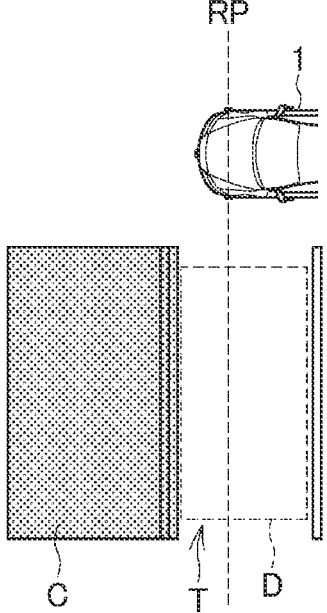
FIG. 9 is a diagram showing the difference between parking paths according to the movement of a virtual obstacle.

By such processing, if the sonar detection position RP has not passed through the parking frame D (step Sa3: No), the virtual obstacle C is positioned adjacent to the parking frame D as shown by the column "Initial position" in FIG. 9, and parking paths are calculated so as not to collide with the virtual obstacle C.

On the other hand, if the sonar detection position RP has passed through the parking frame D (step Sa3: Yes), the virtual object C is moved in parallel corresponding to the separation distance L as shown by the column "After movement" in FIG. 9. Thus, an area through which the vehicle 1 can pass is generated between the parking frame D and the virtual obstacle C. Additionally, with regard to the parking paths, they are calculated in consideration of the area generated between the parking frame D and the virtual obstacle C, and the result of detection by the side sonar 10A on obstacles in this area.

As a result, compared with a case where the virtual obstacle C is not moved, calculating a parking path with a smaller number of times of back-and-forth maneuvering is possible. Note that "the back-and-forth maneuvering" refers to a repeated operation of forward and reverse advances for adjusting the approach angle of the vehicle 1 to the parking lot T, and it may be referred to as switchback.

The present embodiment provides the following effects.

The parking assist apparatus 100 of the present embodiment comprises: the parking lot detection unit 114 configured to detect a parking lot T by detecting division lines TA based on captured images that have captured the periphery of the vehicle 1; the virtual obstacle setting unit 116 configured to set a virtual obstacle C to a position adjacent to the parking frame D set in the parking lot T; the virtual obstacle moving unit 117 configured to move the virtual obstacle C in parallel in a passing direction F of the vehicle 1 by a moving amount M corresponding to the separation distance L between the parking lot T and the vehicle 1 (more precisely, the sonar detection position RP) when the vehicle 1 passes through the parking lot T; and the parking path computing unit 118 configured to generate a parking path along which the vehicle 1 is to move from the current position to be parked in the parking lot T based on the current position of the vehicle 1 and respective positions of obstacles, virtual obstacles C, and the parking frame D in the parking lot T.

According to this configuration, in a case where the sonar detection position RP is positioned at the farther side of the parking frame D when viewed from a position frontward beyond the parking frame D in the parking lot T, the virtual obstacle C is moved to a position corresponding to the sonar detection position RP; and thus, an area available for the parking paths are provided between the parking frame D and the virtual obstacle C. As a result, the area available for the parking paths increases, allowing to obtain more appropriate parking paths.

In addition, since this is a configuration where the parking lot T as an available parking space E, in which the vehicle 1 can be parked, is detected not based on the detection result of the side sonar 10A but the images captured by the camera 10B, it is possible to detect the parking lot T at an earlier stage compared to a configuration in which the available parking space E is detected based on the detection result of the side sonar 10A.

Moreover, since this is a configuration where the parking lot T is detected, the posture (front and rear direction) of another vehicle 3 as an obstacle that may exist next to the parking lot T can be inferred based on the direction of the parking lot T as well.

Therefore, only by moving the virtual obstacle C in parallel without identifying the posture of another vehicle 3 next to the parking lot T based on a detection result of the side sonar 10A, or without waiting for the identification by the detection result, it is possible to immediately move the virtual obstacle C to a position that matches the posture of the another vehicle 3.

As a result, compared to the configuration of identifying the detection of an available parking space E and the posture and the shape of an obstacle existing next to a parking lot T using the detection result of the side sonar 10A, it is possible to identify them at an earlier timing; and the earlier identification of them allows the vehicle 1 to be parked nearer to the parking lot T so as to calculate a shorter parking path.

In the parking assist apparatus 100 of the present embodiment, a virtual obstacle C is set to have a size based on another vehicle 3 that can be parked next to the parking lot T, and set in parallel with the parking lot T.

As a result, it is possible to appropriately calculate parking paths in a parking where a plurality of other vehicles 3 are parked in parallel.

In the parking assist apparatus 100 of the present embodiment, the obstacle detection unit 112 uses, among the peripheral information obtained from the side sonar 10A provided in the vehicle 1, a detection result which is within the range of a predetermined angle about a main axis RK of the detection range R in a fan-shape (where the predetermined angle<the central angle of the detection range R in a fan-shape).

As a result, obstacles can be detected with high reliability.

Note that the aforementioned embodiment is just illustrative of one aspect of the present invention, and it is arbitrarily deformable and applicable without departing from the scope of the present invention.

In the aforementioned embodiment, the parking frame setting unit 115 has set the parking frame D within the parking lot T. However, the parking frame setting unit 115 may set the contour of the parking lot T as the parking frame D.

The aforementioned embodiment exemplified a case where the vehicle 1 is parked in the parking lot T which is arranged in parallel with other vehicles 3 and other parking lots T. However, as shown in FIG. 10, it is possible to apply the present invention to a case where the vehicle 1 is parked in the parking lot T which is aligned in series with other vehicles 3 and other parking lots T (in a case of so-called parallel parking).

Figure 10:
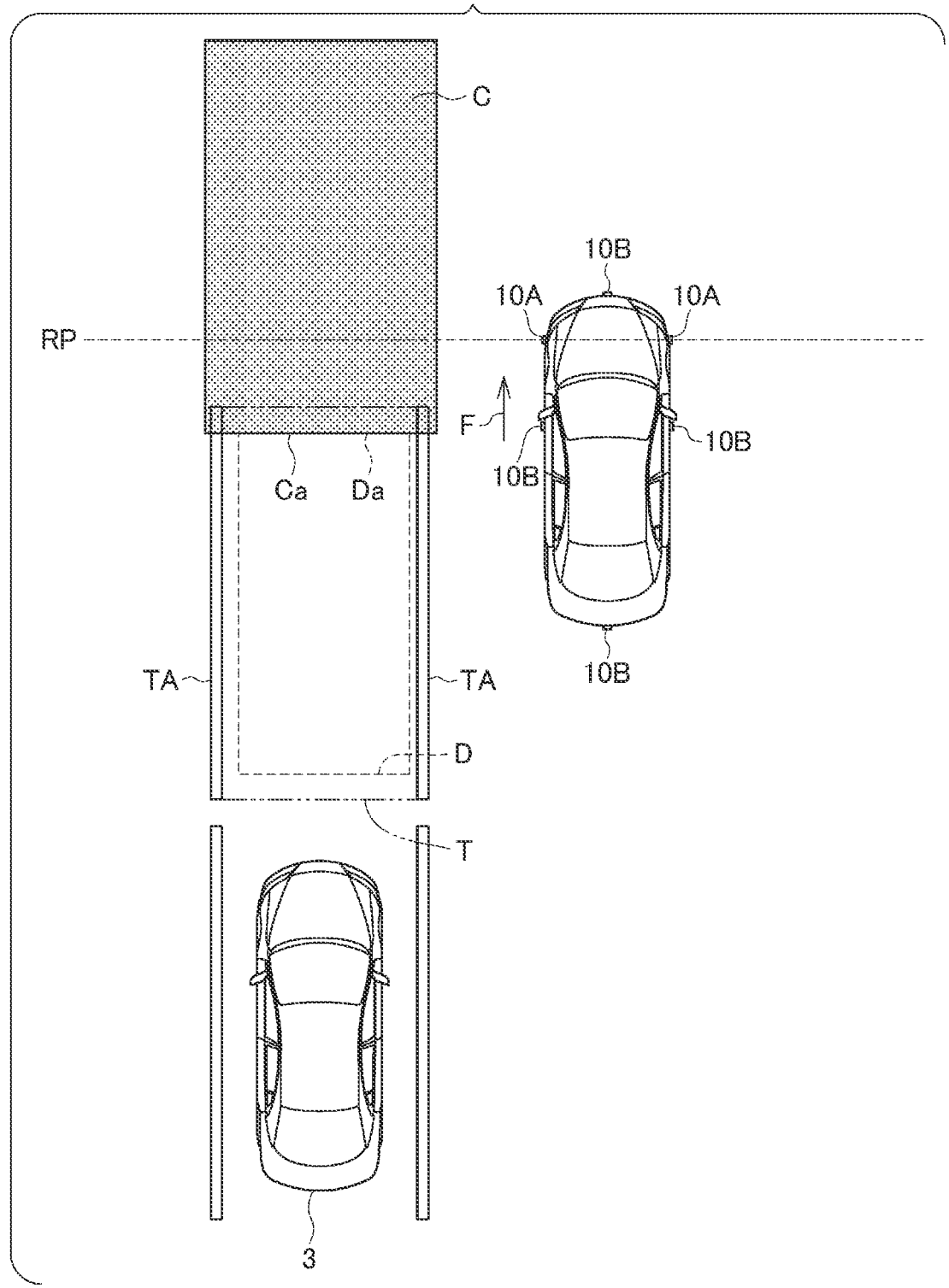
FIG. 10 is a diagram showing a parking lot according to a modified example of the first embodiment according to the present invention.

In such a case, note that the initial position of the virtual obstacle C is a position adjacent to the parking frame D in the series direction as shown in FIG. 10. In addition, the aforementioned farthest side Da of the parking frame D is not a long side extending in the front and rear direction of the vehicle 1 but a farthest side when viewed from a position frontward beyond the parking lot T among short sides extending in the width direction of the vehicle 1.

In the aforementioned first embodiment, the functional block shown in FIG. 1 is a schematic view showing constitutional elements of the vehicle 1 and the parking assist apparatus 100 by classifying them according to the main processing content so as to make the invention of the present application be understood easily. These constitutional elements can be further classified into a larger number of constitutional elements according to the processing content. It is also possible to classify them such that one constitutional element executes further more processing.

In addition, processing of each constitutional element of the parking assist apparatus 100 may be executed by one hardware, or may be executed by a plurality of hardware. Further, the processing of each constitutional element may be realized by one program, or may be realized by a plurality of programs.

Second Embodiment

The second embodiment of the present invention will be described.

Japanese Patent Laid-Open No. 2019-182154 discloses a technique related to automatic parking.

The section of the abstract in Japanese Patent Laid-Open No. 2019-182154 describes a problem as follows: "In automatic parking, a path from a parking start position to a target parking position is calculated prior to the start of parking; however, there is a case where it is not possible to detect an obstacle at a remote place or in a blind spot by an exterior recognition apparatus, and smooth parking is prevented in actual automatic parking in such a case."

The section of the abstract in Japanese Patent Laid-Open No. 2019-182154 describes a means to solve the problem as follows: "In step S1101, a vehicle is virtually moved from a parking start position 1201 in a direction of back-and-forth maneuvering to calculate a back-and-forth maneuvering position 1206 on a parking path 1205. In step S1103, a preliminary path to a target parking position 1207 when a back-and-forth maneuvering is performed at the back-and-forth maneuvering position 1206 is calculated. In the subsequent step 1104, it is determined whether the generation of the preliminary path has been possible, and when the preliminary path satisfies a predetermined condition, a path calculated by a candidate path operation unit 501 is adopted as the path for automatic parking."

The technique in Japanese Patent Laid-Open No. 2019-182154 assumes the configuration of "based on an area where a vehicle being recognized based on external information can travel, generating a candidate path from a current position to a target parking position of the vehicle."

However, when the accuracy of recognition of the "area where the vehicle can travel" is low, the area the vehicle can travel is usually set narrower than the actual area so as to avoid colliding with obstacles. Additionally, due to the need of moving the vehicle to a parking position within a narrower area, a complicated path including back-and-forth maneuvering, which is a repeated operation of forward and reverse advances, tends to be adopted as the path for automatic parking.

The present embodiment explains a parking assist apparatus, which can set parking paths more appropriately than the technique of Japanese Patent Laid-Open No. 2019-182154, and a method of controlling the parking assist apparatus.

Figure 11:
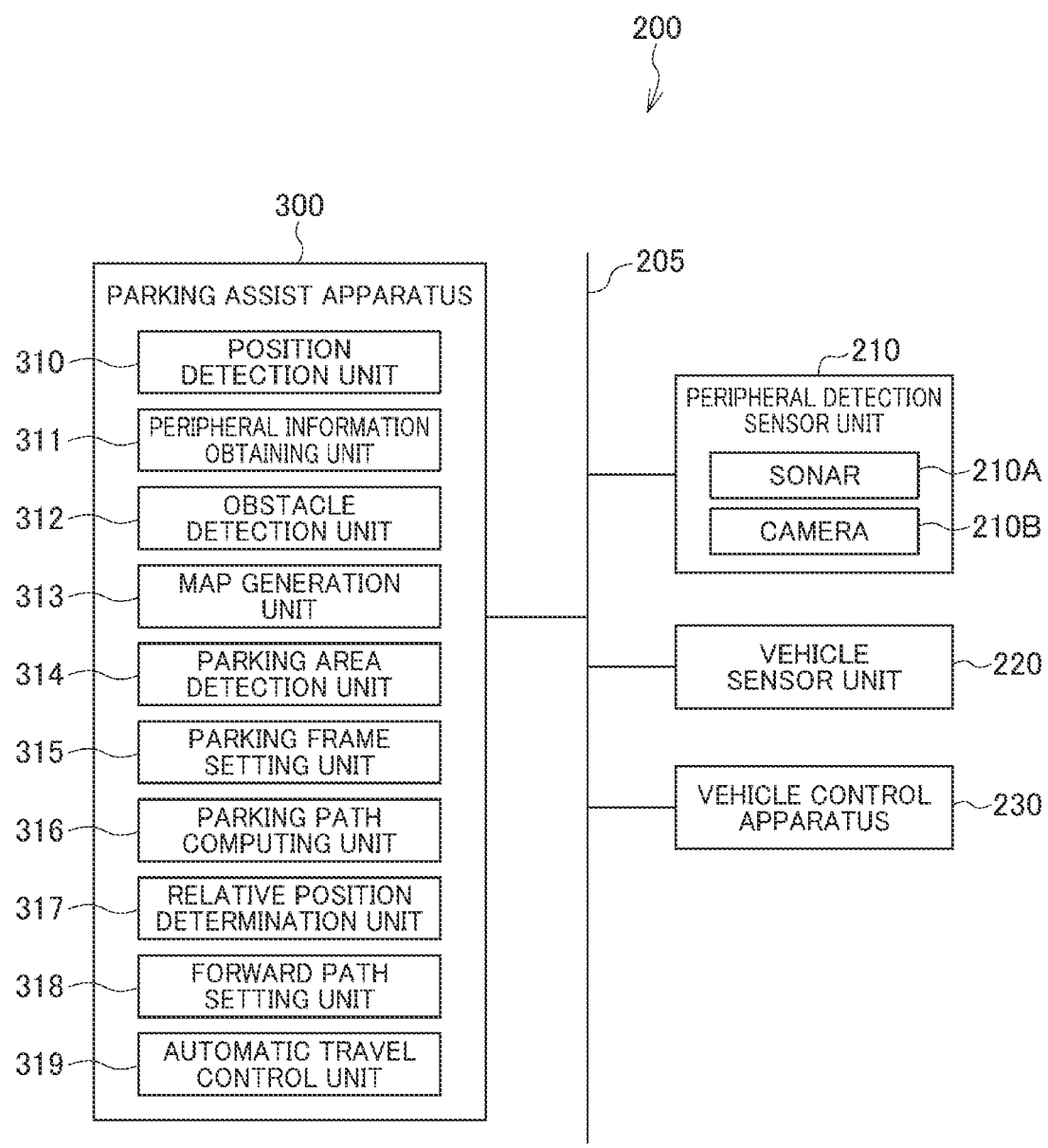
FIG. 11 is a diagram showing the structure of a vehicle mounted with the parking assist apparatus according to the second embodiment of the present invention.

FIG. 11 is a diagram showing the structure of a vehicle 200 mounted with the parking assist apparatus 300 according to the embodiment of the present invention.

The vehicle 200 comprises a peripheral detection sensor unit 210, a vehicle sensor unit 220, a vehicle control apparatus 230, and a parking assist apparatus 300, and these are connected through a vehicle-mounted network 205 such as a CAN (Controller Area Network) bus so as to communicate data.

The peripheral detection sensor unit 210 comprises various kinds of sensors for detecting information on the periphery of the vehicle 200, and outputs detection results (output) to a parking assist apparatus 300. Hereinafter, the information on the periphery is referred to as the "peripheral information."

The peripheral information includes information on objects existing in the periphery of the vehicle 200, wherein the objects are obstacles, and division lines dividing a parking lot in the vehicle 200, for example. The obstacles are various objects that can be obstruction to the travel of the vehicle 200. Typical examples of the obstacles are building structures such as pillars, walls and fire hydrants, other vehicles while parking and traveling, and passersby.

The peripheral detection sensor unit 210 of the present embodiment comprises a sonar 210A and a camera 210B.

The sonar 210A is a distance measuring sensor of detecting a peripheral obstacle with sound waves to measure the distance between the obstacle and the vehicle 200.

Figure 12:
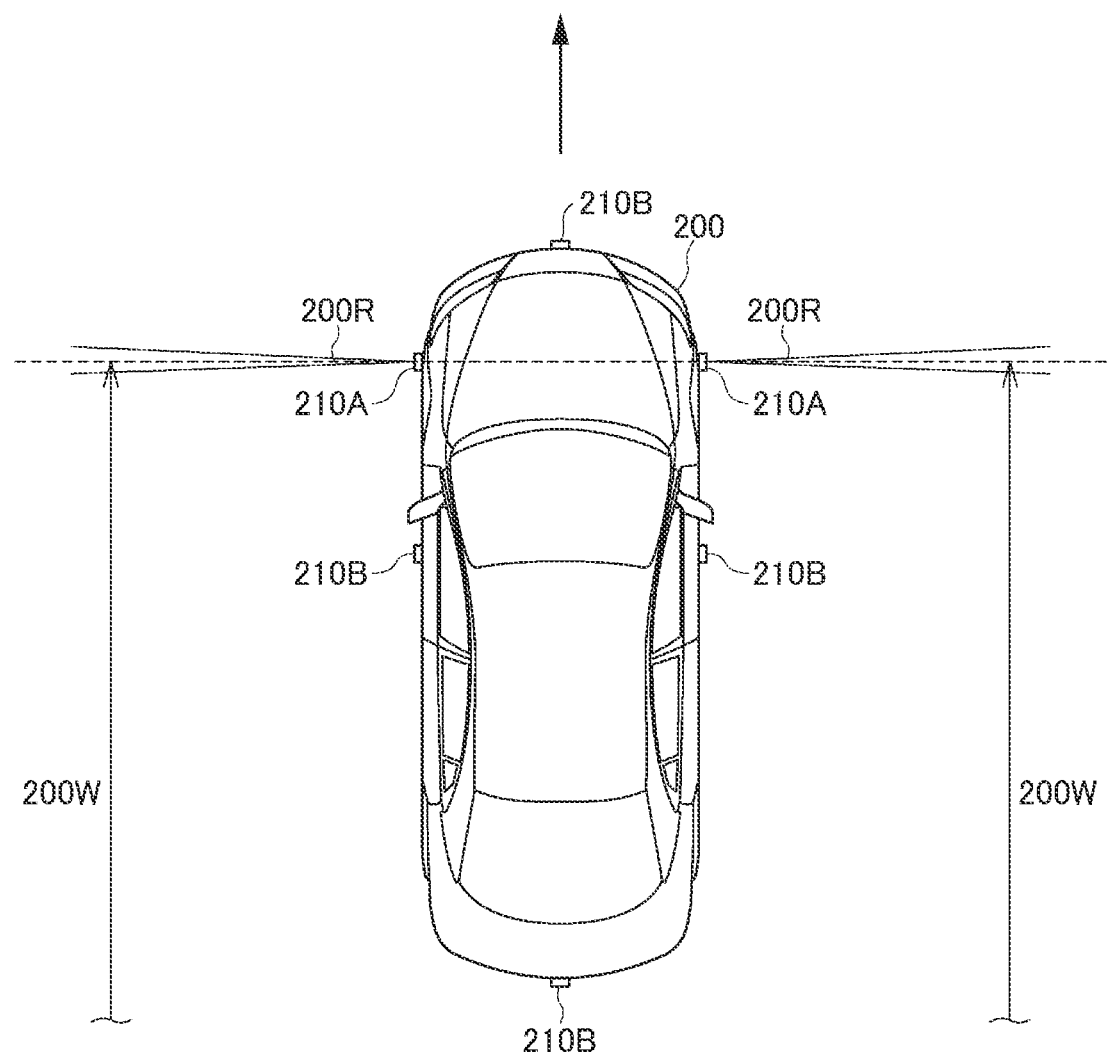
FIG. 12 is a diagram showing one example of installation mode of a side sonar and a camera.

In the present embodiment, the sonar 210A is provided on each of the left and light sides of the vehicle 200 as shown in FIG. 12, and is also referred to as a side sonar. In such a sonar 210A, a detection range 200R is formed into a beam shape so as to enhance the directivity of the vehicle 200 to the sides. As a result, as the vehicle 200 travels (the forward advance in the example of FIG. 12), obstacles are detected with high accuracy with regard to an area 200W through which the detection range 200R of the sonar 210A of the vehicle 200 has passed.

The camera 210B is an imaging means that captures images of a parking area 200Q.

In the vehicle 200 in the present embodiment, the cameras 210B are provided in the front, left, right and back sides, respectively. These cameras 210B capture images of all directions about the vehicle 200.

Note that the camera 210B may be configured to be a single camera that captures the images of all directions. In addition, the imaging range by the camera 210B and the number of the camera 210B can be appropriately changed.

The vehicle sensor unit 220 is mounted on the vehicle 200, and comprises various sensors for detecting a traveling state of the vehicle 200 and various information required for an autonomous navigation (dead reckoning). Such sensors include a gyro sensor, an acceleration sensor, a vehicle speed sensor, and a steering angle sensor of detecting a steering angle of the vehicle 200 and the like, for example.

The vehicle control apparatus 230 controls a steering apparatus, a driving apparatus and a brake control apparatus of the vehicle 200 so as to make the vehicle 200 autonomously move (automatic travel) based on parking paths described later, which are calculated by the parking assist apparatus 300. The vehicle control apparatus 230 comprises a computer executing such a control (e.g., an ECU (Electronic Control Unit)).

Note that the steering apparatus is an apparatus including an actuator for steering a steering wheel of the vehicle 200.

In addition, the driving apparatus is an apparatus including an actuator of adjusting driving force on the driving wheel of the vehicle 200. If a power source of the vehicle 200 is an engine, the actuator of the driving apparatus is a throttle actuator. If the power source is a motor, the actuator of the driving apparatus is a power source motor.

The brake control apparatus has an actuator that controls braking force to be applied to wheels of the vehicle 200 by controlling a brake system provided in the vehicle 200.

The parking assist apparatus 300 is an apparatus configured to make the vehicle 200 automatically travel to the parking area 200Q so as to assist parking of the vehicle 200.

The parking assist apparatus 300 comprises a computer comprising processors such as a CPU (Central Processing Unit) and MPU (Microprocessor Unit), memory devices (memory) (also referred to as main storage apparatuses) such as a ROM (Read Only Memory) and a RAM (Random Access Memory), storage apparatuses (memory) (also referred to as auxiliary storage apparatuses) such as an HDD (Hard Disk Drive) and an SSD (Solid State Drive), an interface circuit for connecting sensors, peripheral devices and the like, and a vehicle-mounted network communication circuit of communicating with other vehicle mounted devices via the vehicle-mounted network 205. An ECU (Electronic Control Unit) is used as such a computer.

In the parking assist apparatus 300, a processor executes a computer program stored in the memory devices or storage apparatuses so as to realize various functional configurations shown in FIG. 11.

Namely, the parking assist apparatus 300 comprises, as the functional configurations, a position detection unit 310, a peripheral information obtaining unit 311, an obstacle detection unit 312, a map generation unit 313, a parking area detection unit 314, a parking frame setting unit 315, a parking path computing unit 316, a relative position determination unit 317, a forward path setting unit 318, and an automatic travel control unit 319.

The position detection unit 310 detects the current position (self position) of the vehicle 200 based on detection result (output) by the vehicle sensor unit 220, using a publicly known or well-known dead reckoning method.

The peripheral information obtaining unit 311 obtains peripheral information based on detection result (output) by the peripheral detection sensor unit 210.

The obstacle detection unit 312 detects obstacles in the periphery of the vehicle 200 based on peripheral information.

More specifically, the obstacle detection unit 312 detects the obstacles in the periphery based on detection result by the sonar 210A to detect the positions of obstacles relative to the vehicle 200.

The map generation unit 313 generates map data based on detection result by the obstacle detection unit 312. The map data is data in which positions of respective obstacles are recorded to a local spatial coordinate system having the current position of the vehicle 200 at an arbitral timing being set as the origin.

The parking area detection unit 314 detects the parking area 200Q, which is an area where the vehicle 200 is to be parked, based on peripheral information. A publicly known or well-known technique can be used for the detection method of the parking area 200Q based on the peripheral information.

For example, the parking area detection unit 314 recognizes a rectangular area with a size large enough to park the vehicle 200, based on the distribution of obstacles shown by the map data, so as to detect the area as the parking area 200Q.

The parking area detection unit 314 also recognizes, for example, division lines of a parking lot by image recognition of images captured by the camera 210B so as to detect the parking area 200Q. In such a case, the parking area detection unit 314 converts, by a projection conversion from a two-dimensional coordinate system of a captured image to a local spatial coordinate system of map data, the position of the parking area 200Q in the captured image to a position of the local spatial coordinate system of the map data. This projection conversion can be performed by a publicly known or well-known arbitral technique. The position of the parking area 200Q is identified by the projection conversion to the local spatial coordinate system.

The parking frame setting unit 315 sets, in the parking area 200Q, a rectangular parking frame 200D defining a range in which the vehicle 200 is accommodated while parking, based on the parking area 200Q detected by the parking area detection unit 314. Note that, when the parking area 200Q is a parking lot divided by division lines, the parking frame setting unit 315 sets the division lines as the parking frame 200D.

The parking path computing unit 316 computes and calculates parking paths based on the map data.

The parking paths in the present embodiment are paths of moving the vehicle 200 from the current position of the vehicle 200 to the parking area 200Q such that the vehicle 200 is parked in the parking frame 200D of the parking area 200Q by reverse parking without colliding with the peripheral obstacles.

The reverse parking refers to entering the vehicle 200 to the parking area 200Q by moving it backward.

The relative position determination unit 317 determines the relative positional relationship between the current position of the vehicle 200 and the parking frame 200D at the time of the start of automatic parking.

More specifically, the relative position determination unit 317 determines whether the vehicle 200 (more precisely, the detection range 200R of the sonar 210A) exceeds a predetermined set position 200T.

Figure 13:
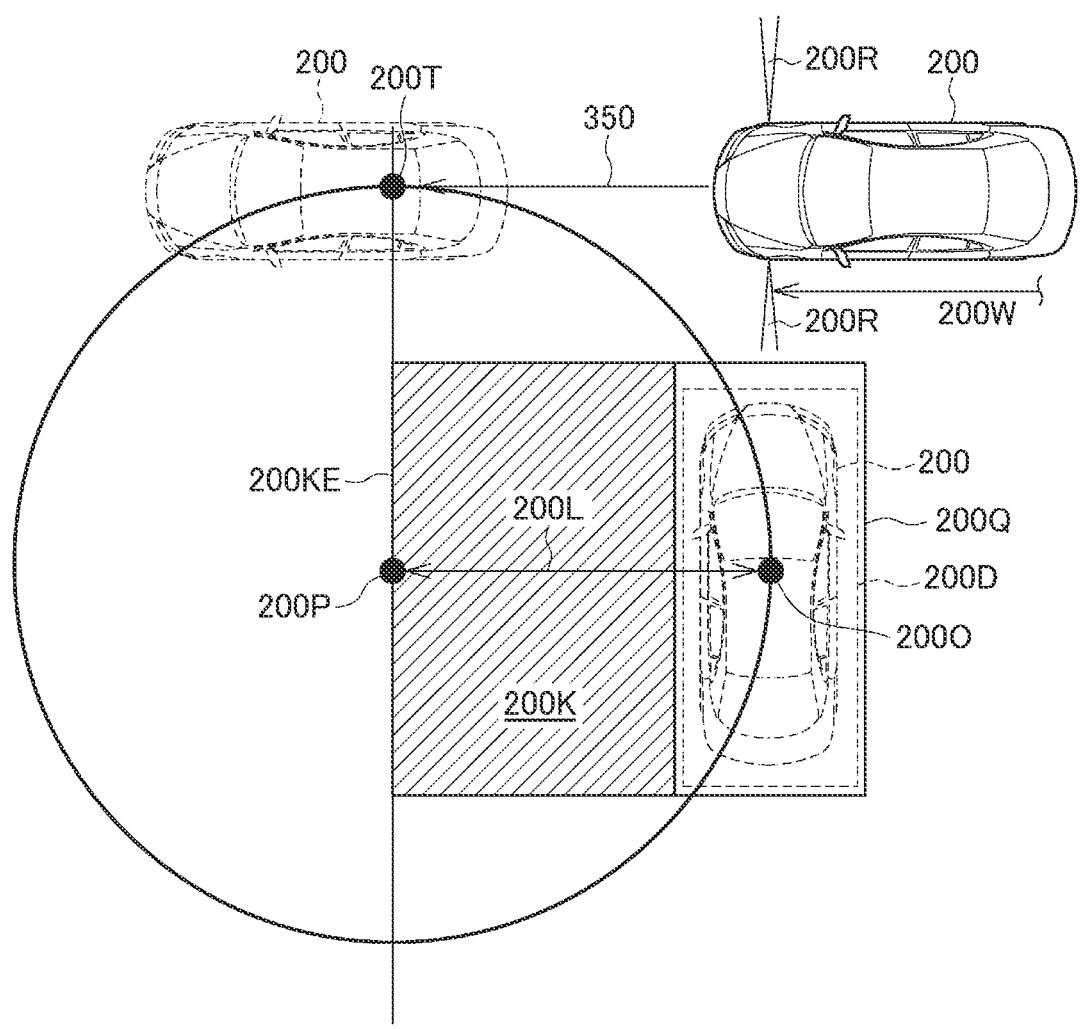
FIG. 13 is a diagram for explaining a parking area, a parking frame, a distal adjacent area, and a set position.

In addition, the set position 200T is a position being set farther than the parking frame 200D on an advancing path of the vehicle 200 when viewed from a position frontward beyond the parking frame 200D as shown in FIG. 13.

Moreover, the position frontward beyond a target is a position of the vehicle 200 advancing toward the target, that is, the position of the vehicle 200 before reaching the target.

Therefore, it can be said that the set position 200T is a position where the detection range 200R of the sonar 210A proceeds to some degree after passing through the parking frame 200D, and reaches thereafter. It is shown that if the vehicle 200 is positioned frontward beyond the set position 200T, no obstacle detection by the sonar 210A is performed for an area at the farther side than the parking frame 200D when viewed from a position frontward beyond the parking frame 200D. Note that hereinafter, such an area being at the farther side and adjacent to the parking frame 200D is referred to as "the distal adjacent area 200K."

In the present embodiment, the set position 200T is configured to be a position in which the vehicle can be moved to the parking frame 200D from the set position 200T by a reverse advance without including back-and-forth maneuvering as shown in FIG. 13. Such a set position 200T is set based on a position 200P spaced in the advance direction of the vehicle 200 from the center 200O of the parking frame 200D by at least the minimum turning radius 200L of the vehicle 200.

Note that the back-and-forth the maneuvering refers to a repeated operation of forward and reverse advances for changing the approach angle of the vehicle 200 to the parking frame 200D, and it may be referred to as switchback.

The distal adjacent area 200K is also an area through which the vehicle 200 can pass when moving from the set position 200T to the parking area 200Q for the reverse parking; and as shown in FIG. 13, it is set as a rectangular area in which the position 200P is configured to be a terminal end 200KE.

The forward path setting unit 318 sets, if the vehicle is positioned forward with respect to the set position 200T at the time of the start of automatic parking, a forward path 350 of advancing the vehicle 200 to the set position 200T.

The automatic travel control unit 319 generates control information for advancing the vehicle 200 by automatic travel, and outputs the control information to the vehicle control apparatus 230. The automatic travel control unit 319 generates such control information for each of the parking paths calculated by the parking path computing unit 316 and the forward path 350 set by the forward path setting unit 318.

Next, an operation of the present embodiment will be explained.

While a passenger drives the vehicle 200 to move in a parking, in the parking assist apparatus 300, the obstacle detection unit 312 continuously detects obstacles in the periphery (e.g., other vehicles 203 (FIG. 14)) based on peripheral information, and a map generation unit 313 sequentially records in map data the positions of obstacles detected by the obstacle detection unit 312. Additionally, the parking area detection unit 314 continuously detects the parking area 200Q existing at a side of the vehicle 200 based on the distribution of obstacles shown by the map data, or based on the image recognition result of captured images.

Figure 14:
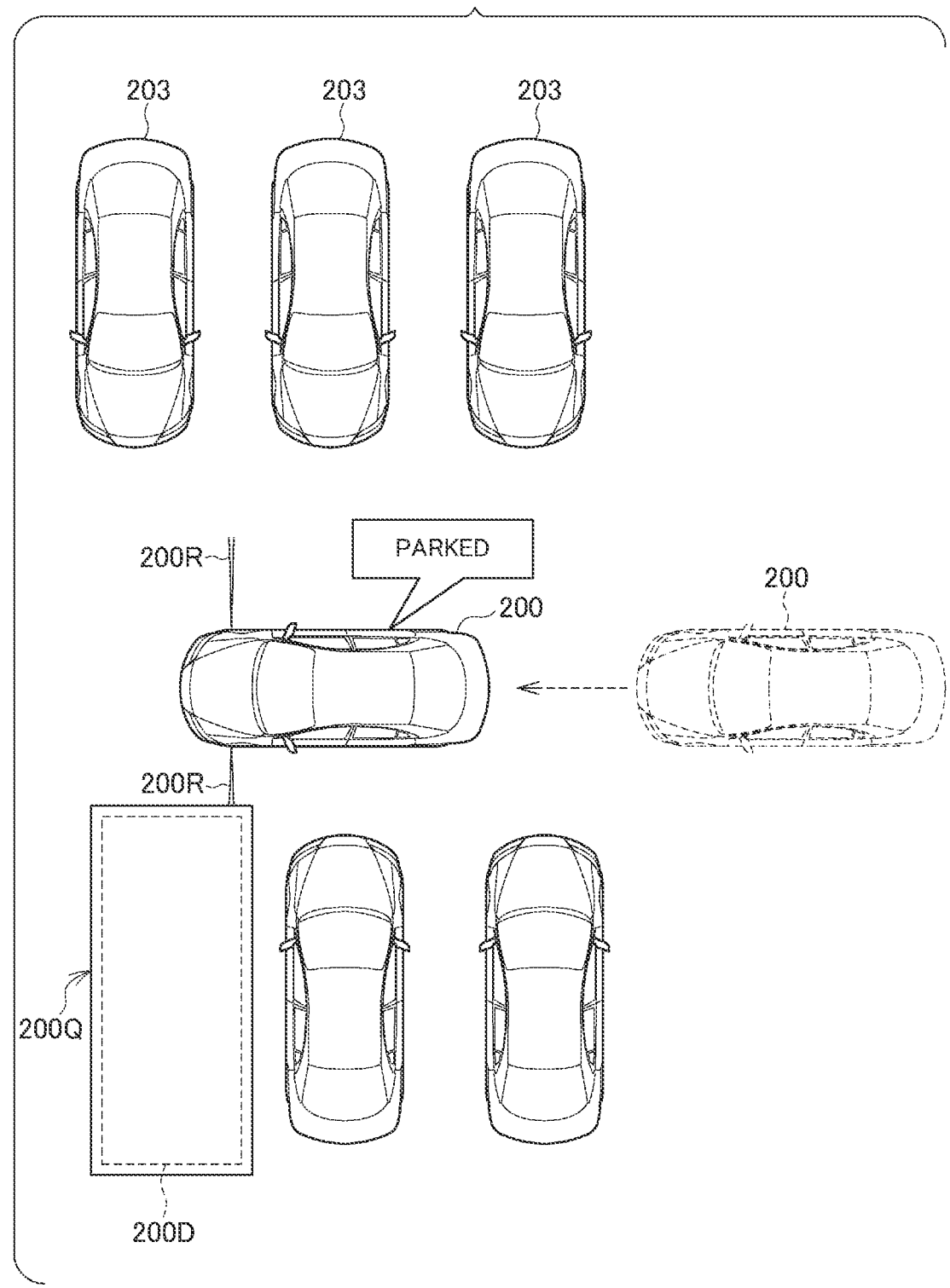
FIG. 14 is a diagram for explaining an operation as a premise of the present embodiment.

As shown in FIG. 14, when a passenger finds the parking area 200Q in front of the vehicle 200, the passenger stops the vehicle 200 and operates an HMI (Human Machine Interface) not being shown so as to instruct the parking assist apparatus 300 to perform automatic parking.

The parking assist apparatus 300 starts, when the instruction for automatic parking is input, automatic parking processing for making the vehicle 200 to enter the parking area 200Q by automatic travel. Consequently, it is assumed that the parking area 200Q is detected by the parking area detection unit 314.

Figure 15:
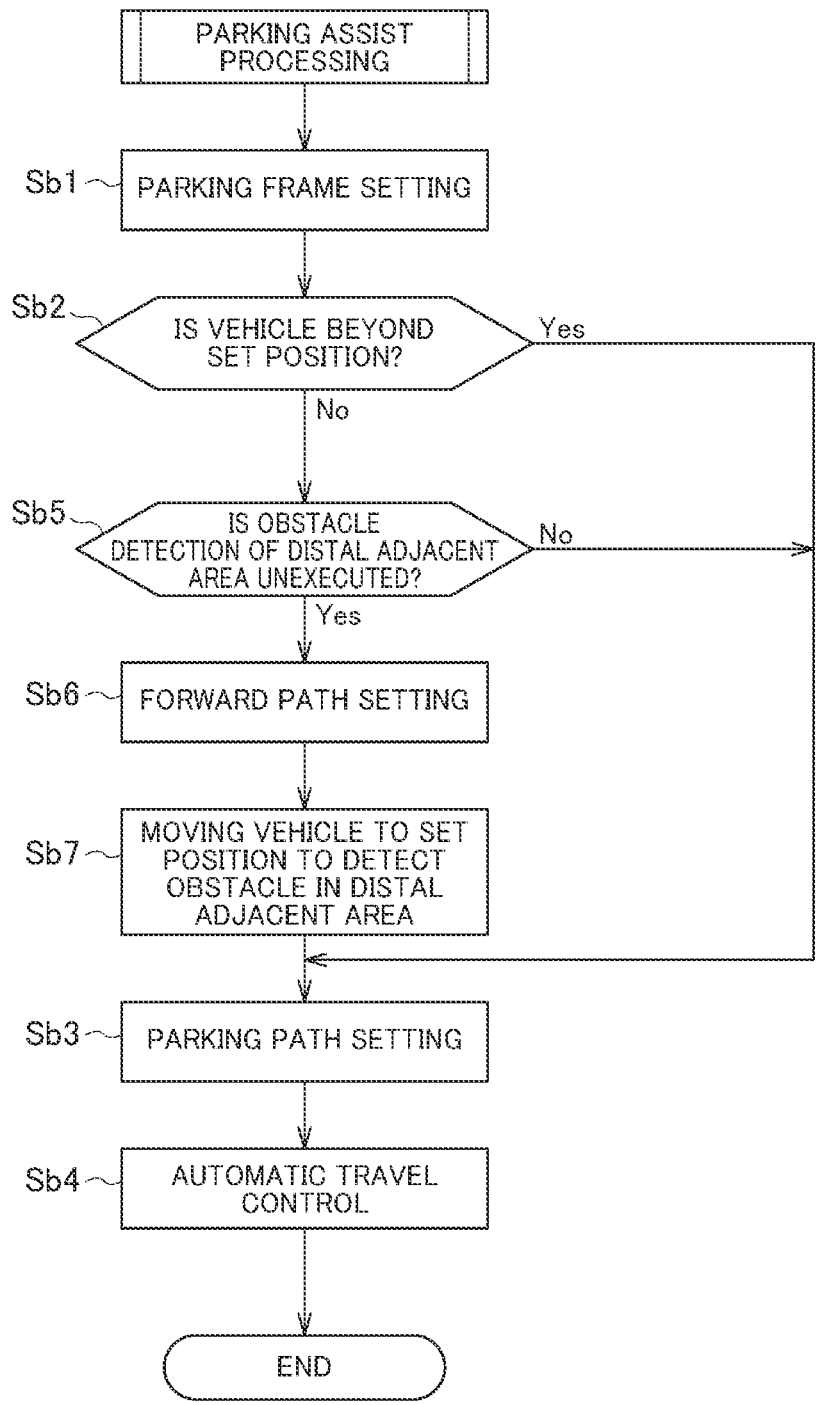
FIG. 15 is a flow chart of parking assist processing.

FIG. 15 is a flow chart of automatic parking processing.

First of all, the parking frame setting unit 315 sets the parking frame 200D with respect to the parking area 200Q (step Sb1).

Then, the relative position determination unit 317 determines whether the vehicle 200 exceeds the set position 200T (step Sb2).

When the vehicle 200 exceeds the set position 200T (step Sb2: Yes), it shows that the detection range 200R of the sonar 210A has already passed through the distal adjacent area 200K. Therefore, in such a case, the obstacle detection has already been performed for this distal adjacent area 200K, and the detection result has already been recorded in the map data.

In this case, based on such map data, the parking path computing unit 316 computes and calculates parking paths along which the vehicle 200 is to be moved from the current position to the parking area 200Q (step Sb3).

Additionally, in order to make the vehicle 200 automatically travel along a parking path to the parking area 200Q, the automatic travel control unit 319 generates control information based on the parking path and outputs the control information to the vehicle control apparatus 230 (step Sb4). The vehicle 200 starts automatic travel from the current position (stop position) by the control of the vehicle control apparatus 230 to enter the parking area 200Q.

On the other hand, when the vehicle 200 is positioned frontward beyond the vehicle 200 with respect to the set position 200T and does not exceed the set position 200T (step Sb2: No), the parking path computing unit 316 first determines whether the obstacle detection of the distal adjacent area 200K has not been executed yet (step Sb5). For example, when the vehicle 200 circulatingly moves in a parking, there are cases where the obstacle detection of the distal adjacent area 200K has already been performed and the detection result has already been stored in map data.

The parking path computing unit 316 proceeds to the aforementioned step Sb3 when the obstacle detection of the distal adjacent area 200K has been executed (step Sb5: No) to compute parking paths based on the map data, and the automatic travel control unit 319 generates control information based on the parking paths for automatic travel to the parking area 200Q (step Sb4).

When the obstacle detection of the distal adjacent area 200K has not been executed (step Sb5: Yes), the parking assist apparatus 300 executes the following processing so as to detect the existence of obstacles in the distal adjacent area 200K.

First of all, the forward path setting unit 318 sets the forward path 350 of advancing the vehicle 200 to the set position 200T (step Sb6).

Then, the automatic travel control unit 319 generates control information based on the forward path 350 and outputs the control information to the vehicle control apparatus 230 (step Sb7). As a result, the vehicle 200 starts automatic travel from the current position (stop position) to the set position 200T.

During this automatic travel, the obstacle detection unit 312 continuously detects obstacles based on the peripheral information, and the map generation unit 313 sequentially records in map data the positions of the obstacles detected by the obstacle detection unit 312. As a result, the distribution of the obstacles regarding the distal adjacent area 200K is recorded in the map data (step Sb8).

Additionally, the parking assist apparatus 300 advances the processing step to step Sb3, the parking path computing unit 316 computes a parking path based on the map data in this step Sb3, and the automatic travel control unit 319 generates control information based on this parking path (step Sb4).

Figure 16:
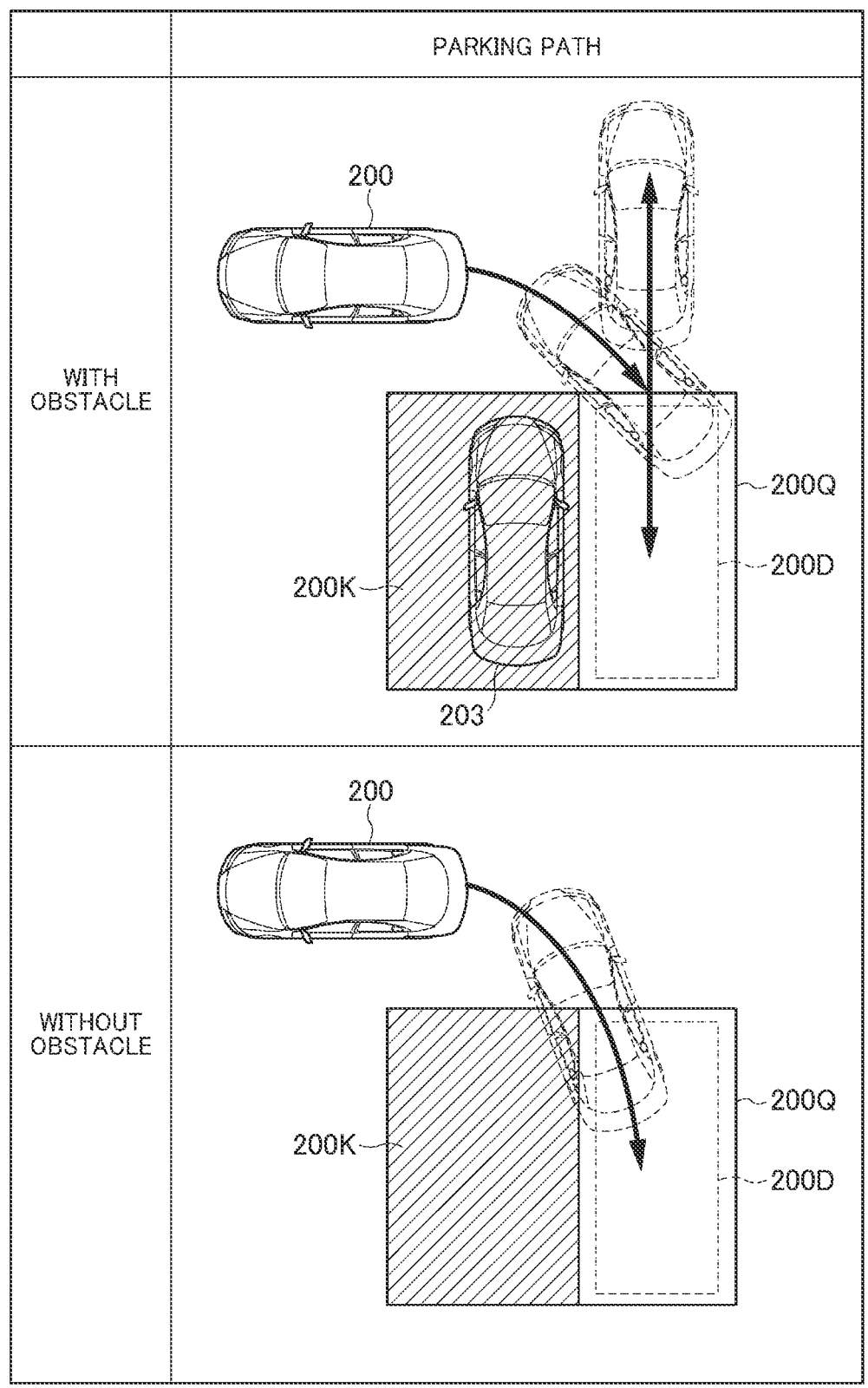
FIG. 16 is a diagram showing an example of parking paths being different depending on the existence of obstacles in a distal adjacent area.

As a result, when an obstacle (another vehicle 203 in the example of FIG. 16) exists in the distal adjacent area 200K as shown in FIG. 16, it is necessary in step Sb3 that the parking path computing unit 316 moves the vehicle 200 to the parking frame 200D without passing through the distal adjacent area 200K; and thus, as shown in FIG. 16, a parking path including one or a plurality of number of times of back-and-forth maneuvering is computed.

On the other hand, when no obstacle exists in the distal adjacent area 200K, there is no problem if the parking path transverses this distal adjacent area 200K; and thus, in step Sb3, the parking path computing unit 316 calculates a parking path of entering the vehicle 200 by reverse advance from the set position 200T to the parking frame 200D without including back-and-forth maneuvering.

The present embodiment provides the following effects.

According to the parking assist apparatus 300 in the present embodiment, when the vehicle 200 does not exceed the set position 200T set farther than the parking frame 200D when viewed from a position frontward beyond the parking frame 200D, the vehicle 200 is moved to this set position 200T. Then, the parking assist apparatus 300 computes parking paths of moving the vehicle 200 from the set position 200T to the parking frame 200D based on the map data reflecting the peripheral information obtained during this movement.

As a result, it is possible to obtain appropriate parking paths depending on the existence of obstacles in the distal adjacent area 200K, which is an area at the farther side of the parking frame 200D when viewed from a position frontward beyond the parking frame 200D.

In the parking assist apparatus 300 in the present embodiment, the set position 200T is configured to be a position in which the vehicle 200 can be moved to the parking frame 200D without including back-and-forth maneuvering which is a repeated operation of forward and reverse advances.

Therefore, when no obstacle exists in the distal adjacent area 200K, it is possible to adopt a parking path that does not includes back-and-forth maneuvering while passing through the distal adjacent area 200K.

In the parking assist apparatus 300 in the present embodiment, the set position 200T is set based on a position spaced in the advance direction of the vehicle 200 from the center 200O of the parking frame 200D by at least the minimum turning radius 200L of the vehicle 200.

As a result, when no obstacle exists in the distal adjacent area 200K, it is possible to adopt a simple parking path of just performing reverse turning of the vehicle 200 from the set position 200T by the minimum turning radius 200L.

Note that the aforementioned second embodiment is just illustrative of one aspect of the present invention, and it is arbitrarily deformable and applicable without departing from the scope of the present invention.

The functional block shown in FIG. 11 is a schematic view showing constitutional elements of the vehicle 200 and the parking assist apparatus 300 by classifying them according to the main processing content so as to make the invention of the present application be understood easily. These constitutional elements can be further classified into a larger number of constitutional elements according to the processing content. It is also possible to classify them such that one constitutional element executes further more processing.

In addition, processing of each constitutional element of the parking assist apparatus 300 may be executed by one hardware, or may be executed by a plurality of hardware. Further, the processing of each constitutional element may be realized by one program, or may be realized by a plurality of programs.

REFERENCE SIGNS LIST 1, 200 Vehicle
10, 210 Peripheral detection sensor unit
10A Side sonar
10B, 210B Camera
100, 300 Parking assist apparatus
110, 310 Position detection unit
111, 311 Peripheral information obtaining unit
112, 312 Obstacle detection unit
114 Parking lot detection unit
115, 315 Parking frame setting unit
116 Virtual obstacle setting unit
117 Virtual obstacle moving unit
118, 316 Parking path computing unit
119, 319 Automatic travel control unit
210A Sonar
314 Parking area detection unit
317 Relative position determination unit
318 Forward path setting unit
350 Forward path
C Virtual obstacle
D, 200D Parking frame
Da Farthest side
F Passing direction
L Separation distance
M Movement amount
R Detection range
RK Main axis
RP Sonar detection position
T Parking lot
TA Division line
200K Distal adjacent area
200L Minimum turning radius
200O Center
200Q Parking area
200T Set position

What is claimed is:

1. A parking assist apparatus comprising:
a processor including a position detection unit configured to detect a current position of a vehicle; and
a sensor provided on the vehicle, the sensor comprising a sonar and a camera configured to detect a periphery of the vehicle,
wherein the processor further includes:
a parking area detection unit configured to detect a parking area in which the vehicle can be parked based on information of the camera;
a parking path computing unit configured to calculate a path along which the vehicle is to be moved from the current position to the parking area based on the parking area detected by the parking area detection unit and a current position of the vehicle,
an obstacle detection unit configured to detect obstacles at a side of the vehicle according to information from the sonar;
a virtual obstacle setting unit configured to set a virtual obstacle at a position adjacent to a parking lot, which is a lot in the parking area;
a virtual obstacle moving unit configured to move the virtual obstacle in parallel in a passing direction of the vehicle by a movement amount corresponding to a separation distance between the parking lot and the vehicle when the vehicle is passing through the parking lot, wherein
the parking path computing unit is configured to
calculate a parking path along which the vehicle is to move from a current position to be parked in the parking lot, based on a current position of the vehicle and each position of an obstacle detected by the sonar, the virtual obstacle, and the parking lot.

2. The parking assist apparatus according to claim 1, wherein
the virtual obstacle is configured to:
set to a size based on another vehicle that can be parked next to the parking lot; and
set in parallel to the parking lot.

3. The parking assist apparatus according to claim 1, wherein
the obstacle detection unit is configured to
use information detected in a predetermined range among pieces of information from the sonar.

4. The parking assist apparatus according to claim 1, wherein the processor further includes:
a peripheral information obtaining unit configured to obtain peripheral information based on an output of the sensor;
a parking frame setting unit configured to set a parking frame, in which the vehicle is to be parked, in the parking area;
a relative position determination unit configured to determine whether the vehicle is beyond a set position being set farther than the parking frame when viewed from a position frontward beyond the parking frame based on a current position of the vehicle;
a forward path setting unit configured to set a forward path along which the vehicle is to be moved to the set position when the vehicle is not beyond the set position; and
an automatic travel control unit configured to move the vehicle to the set position based on the forward path, wherein
the parking path computing unit is configured to
calculate a parking path for moving the vehicle from the set position to the parking frame based on the peripheral information when the vehicle moves to the set position.

5. The parking assist apparatus according to claim 4, wherein
the set position is configured to be a position in which the vehicle can be moved to the parking frame without including back-and-forth maneuvering which is a repeated operation of forward and reverse advances.

6. The parking assist apparatus according to claim 5, wherein
the set position is configured to be a position based on a position separated by a minimum turning radius of the vehicle or more in a forward advance direction of the vehicle from a center of the parking frame.

7. A method of controlling a parking assist apparatus comprising a processor including a position detection unit configured to detect a current position of a vehicle, wherein the method of controlling is configured to:

detect a parking area in which the vehicle can be parked based on information of a sensor that is provided to the vehicle and that comprises a sonar and a camera so as to move the vehicle from a current position to the parking area based on positions of the detected parking area and a current position of the vehicle, wherein the processor further includes an obstacle detection unit configured to detect obstacles at a side of the vehicle according to information from the sonar, the method of controlling configured to comprise:

a first step of setting a virtual obstacle at a position adjacent to a parking lot, which is a lot in the parking area;

a second step of moving the virtual obstacle in parallel in a passing direction of the vehicle by a movement amount corresponding to a separation distance between the parking lot and the vehicle when the vehicle is passing through the parking lot; and a third step of calculating a parking path along which the vehicle is to move from a current position to park in the parking lot, based on a current position of the vehicle and each position of an obstacle detected by the sonar, the virtual obstacle, and the parking lot.

8. The method of controlling a parking assist apparatus according to claim 7, wherein the processor further includes a peripheral information obtaining unit configured to obtain peripheral information based on an output of the sensor, the method of controlling configured to comprise:

a first step of setting a parking frame, in which the vehicle is to be parked, in the parking area;

a second step of determining whether the vehicle is beyond a set position being set farther than the parking frame when viewed from a position frontward beyond the parking frame based on a current position of the vehicle;

a third step of setting a forward path along which the vehicle is to be moved to the set position when the vehicle is not beyond the set position;

a fourth step of moving the vehicle to the set position based on the forward path; and a fifth step of calculating a parking path along which the vehicle is to be moved from the set position to the parking frame based on the peripheral information when the vehicle moves to the set position.

* * * * *